(12) United States Patent
Usui

(10) Patent No.: US 6,507,620 B1
(45) Date of Patent: Jan. 14, 2003

(54) NOISE ELIMINATION METHOD AND TRANSMISSION CIRCUIT

(75) Inventor: Yuzo Usui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/280,650

(22) Filed: Mar. 29, 1999

(30) Foreign Application Priority Data

Apr. 22, 1998 (JP) ............................................. 10-112116
Feb. 9, 1999 (JP) ............................................. 11-031746

(51) Int. Cl.[7] ............................ H04B 3/00; H04L 25/00
(52) U.S. Cl. ........................ 375/257; 375/220; 375/285; 370/201
(58) Field of Search ................................. 375/257, 222, 375/219, 220, 285; 370/201; 379/417

(56) References Cited

U.S. PATENT DOCUMENTS

| | | | |
|---|---|---|---|
| 3,858,010 A | * 12/1974 | Higashide | 375/275 |
| 4,450,555 A | 5/1984 | Pays | |
| 5,087,900 A | 2/1992 | Birchak et al. | |
| 5,638,402 A | * 6/1997 | Osaka et al. | 375/257 |

FOREIGN PATENT DOCUMENTS

| | | |
|---|---|---|
| DE | 11 97 947 B | 9/1961 |
| JP | 57-103439 | 6/1982 |
| JP | 4-322539 | 11/1992 |
| JP | 5-128410 | 5/1993 |
| JP | 7-297686 | 11/1995 |
| JP | 8-186481 | 7/1996 |
| JP | 11-163948 | 6/1999 |

OTHER PUBLICATIONS

Wakeman, Larry, "Transmission–line effects influence high–speed CMOS" E.D.N. Electrical Design News, vol. 29, No. 12, Jun. 1, 1984, pp. 171–177.

Gordon, C et al., "Estimating crosstalk in multiconductor transmission lines"0 IEEE Transactions on Components, Packaging and Manufacturing Technology, Part B: Advanced Packaging, May 1996, vol. 19, No. 2, pp. 273–277.

Kim, J et al., "Transient and crosstak analysis of slightly lossy interconnection lines for wafer scale integration and wafer scale hybrid packaging–weak coupling case" IEEE Transactions on Circuits and Systems, Nov. 1988, USA, vol. 35, No. 11, pp. 1369–1382.

* cited by examiner

Primary Examiner—Phuong Phu
(74) Attorney, Agent, or Firm—Armstrong, Westerman & Hattori, LLP

(57) ABSTRACT

A noise elimination method is characterized in that when transmitting signals in the same direction on at least two distributed constant lines, a resistance of a terminating resistor at a far-end is set so that voltages propagated to the far-end become equal between two kinds of propagation modes on coupled distributed constant lines. The two kinds of propagation modes are a common mode which propagates with respect to a ground plane and a differential mode which propagates between the coupled lines.

24 Claims, 19 Drawing Sheets

BACKWARD NEAR-END CROSSTALK $R_1 = Z_0{}^2/r_1$, $R_2 = Z_0{}^2/r_2$, $R_3 = Z_0{}^2/r_3$, $R_4 = Z_0{}^2/r_4$ $0 < V_{TN}, V_{CC}$ $R = R_{11} + r_{11} + R_{12}$

FORWARD FAR-END CROSSTALK

FORWARD FAR-END CROSSTALK

FORWARD FAR-END CROSSTALK

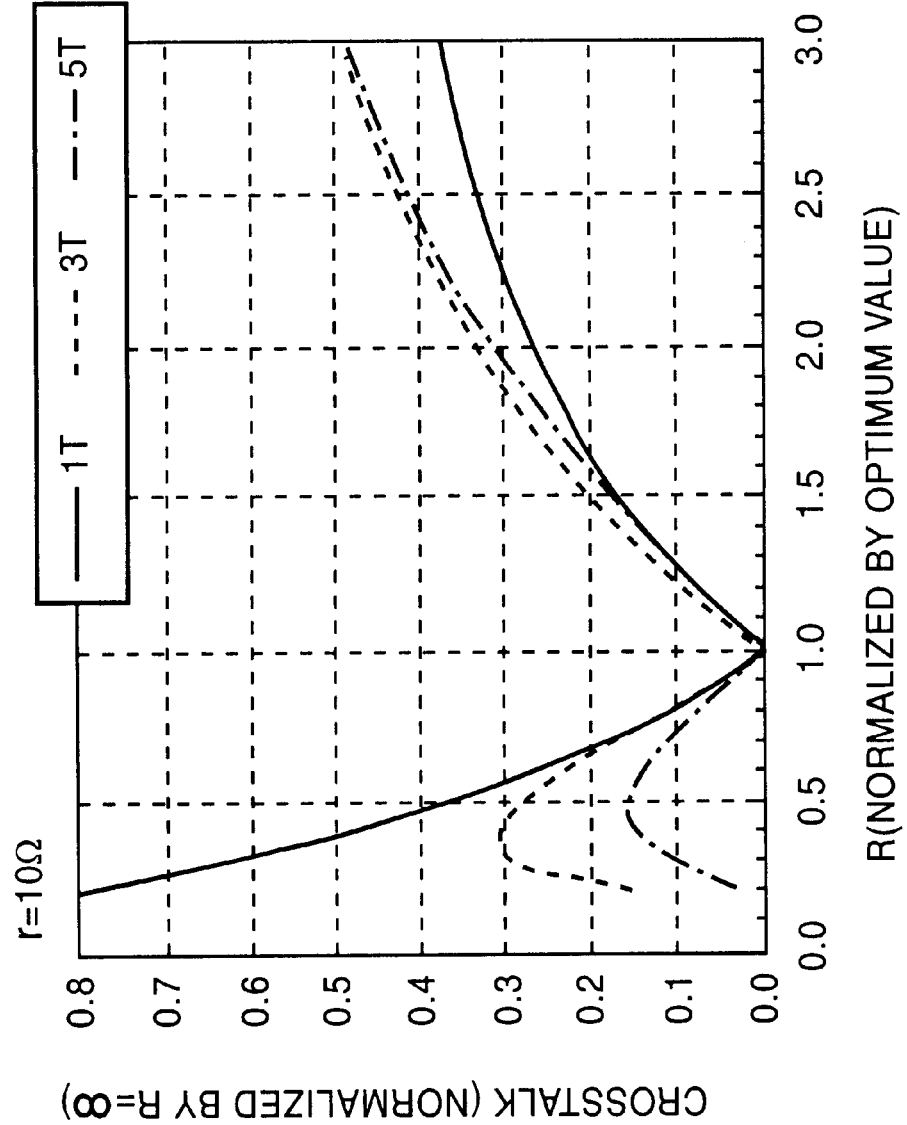

NOISE ELIMINATION METHOD AND TRANSMISSION CIRCUIT

BACKGROUND OF THE INVENTION

1. Field of the Invention

The present invention generally relates to noise elimination methods and transmission circuits for eliminating a crosstalk noise which is generated among a plurality of signal lines, and more particularly to a noise elimination method and a transmission circuit which eliminate a far-end crosstalk noise of a bus transmission by inserting a terminating resistor which has a specific value at a far-end.

2. Description of the Related Art

In electronic equipments such as personal computers, signal transmissions among LSI circuits in most cases are made in units of 32 bits or 64 bits. In such signals, a plurality of bits make transitions at the same timing, thereby causing signal interference among the bits and in many cases generating the crosstalk noise. The value of this crosstalk noise becomes larger as the number of signals which make the transitions simultaneously becomes larger. In addition, the crosstalk noise becomes a large value even in the case of a short line as the signal rise/fall time becomes shorter.

FIGS. 1A and 1B are diagrams for explaining a backward near-end crosstalk for explaining a background of the present invention. FIG. 1A shows a driving line 80, a driver 81, a receiver 82, a passive line 90, a driver 91, and a receiver 92. FIG. 1B additionally shows an internal resistance 83 of the driver 81, a terminating resistor 84, an internal resistance 93 of the driver 91, and a terminating resistor 94 for the case shown in FIG. 1A.

In a case where two lines on which the signal transmitting directions are opposite to each other as shown in FIG. 1A, the backward near-end crosstalk refers to the noise which is introduced on the passive line 90 near the driver 81 due to the signal on the driving line 80.

FIG. 2 is a diagram showing the magnitude of the backward near-end crosstalk which is introduced in the transmission circuit shown in FIGS. 1A and 1B. In FIG. 2, it is assumed that an internal resistance 83 of the driver 81 has a value r=10Ω, and a resistance R of the terminating resistor 84 is infinitely large. In FIG. 2, the ordinate indicates the magnitude of the voltage, and the abscissa indicates the time. In FIG. 2. a thin solid line v1(near) indicates a voltage change on the driving line 80 on the side of the driver 81 (near-end), a thin dotted line v1(far) indicates a voltage change on the driving line 80 on the side of the receiver 82 (far-end), a bold solid line v2(near) indicates a voltage change on the passive line 90 on the side of the driver 91 (near-end), and a bold dotted line v2(far) indicates a voltage change on the passive line 90 on the side of the receiver 92 (far-end).

The backward near-end crosstalk becomes a considerably large value when the value r of the internal resistance 83 of the driver 81 is sufficiently small compared to the characteristic impedance of the passive line 90. For this reason, the value r of the internal resistance 83 is conventionally set large so as to eliminate the backward near-end crosstalk noise.

The terminating resistor 94 is provided to make a waveform matching with respect to the output signal, and the resistance of this terminating resistor 94 is set to a value approximately equal to the characteristic impedance of the passive line 90.

In other words, in a case where the characteristic impedance of the line is 50Ω, the terminating resistor 94 is set to approximately 50Ω.

Conventionally, when signals are transmitted on a plurality of lines in the same direction, no measures were taken with respect to the noise generated at the far-end on the opposite end from the driving side (hereinafter referred to as a forward far-end crosstalk noise) because the amplitude (voltage) of the forward far-end crosstalk noise is small compared to the backward near-end crosstalk noise and the effects of the forward far-end crosstalk noise with respect to the transmission line are small.

Although no measures are conventionally take with respect to the forward far-end crosstalk noise, there is a tendency for the physical distance among the signals to become smaller, due to the increased operation speed of the circuits and the reduced size and weight of the equipments. As a result, there is a tendency for the crosstalk noise to be generated more easily. More particularly, when making a parallel signal transmission of multiple bits such as 32 bits or 64 bits, there exists a case where the logic amplitude changes from a "0" state to a "1" state in all of the bits with the exception of one bit, and in such a case, the effects of the lines on which the logic amplitude of the bits which changed to the "1" state appear at the far-end of the signal line on which the logic amplitude of the bit remained at the "0" state. In some cases, such effects appearing at the far-end become large and no longer negligible. In order to simultaneously achieve the increased operation speed and reduced size and weight of the equipment, it is an object to overcome this crosstalk noise from the point of view of electronic packaging.

But conventionally, in order to reduce the crosstalk noise described above, it was either necessary to increase the physical distance among the signals or to reduce the number of signals which make the transition simultaneously. For this reason, it was either necessary to sacrifice the packaging or mounting density or to sacrifice the performance by relaxing the signal timings.

SUMMARY OF THE INVENTION

Accordingly, it is a general object of the present invention to provide a novel and useful noise elimination method and transmission circuit, in which the problems described above are eliminated.

Another and more specific object of the present invention is to provide a noise elimination method and a transmission circuit which can eliminate a far-end crosstalk of a bus transmission when transmitting signals in the same direction, by a simple means.

Still another object of the present invention is to provide a noise elimination method characterized in that when transmitting signals in the same direction on at least two distributed constant lines, a resistance of a terminating resistor at a far-end is set so that voltages propagated to the far-end become equal between two kinds of propagation modes on coupled distributed constant lines, where the two kinds of propagation modes are a common mode which propagates with respect to a ground plane and a differential mode which propagates between the coupled lines. According to the present invention, it is possible to effectively eliminate the forward far-end crosstalk noise by use of a simple construction.

A further object of the present invention is to provide a noise elimination method characterized in that when first and second driving sources are coupled to respective ends of at least two distributed constant lines on which signals can be transmitted two ways, and a signal is to be transmitted from the first driving source to the other end or from the second driving source to the other end, a resistance of a terminating resistor is set so that an approximately reciprocal relationship exists between an internal resistance of the first or second driving source normalized by a characteristic impedance of the line, and a terminating resistance at a far-end with respect to the first or second driving source normalized by the characteristic impedance of the line. According to the present invention, it is possible to effectively eliminate the forward far-end crosstalk noise by use of a simple construction.

Another object of the present invention is to provide a transmission circuit having at least two distributed constant lines for transmitting signals in the same direction, characterized in that a terminating resistor is coupled at a far-end of the distributed constant lines, and the terminating resistor has a terminating resistance which is set so that an approximately reciprocal relationship exists between the terminating resistance which is normalized by a characteristic impedance of the line and an internal resistance of a driving source which is normalized by the characteristic impedance of the line. According to the present invention, it is possible to effectively eliminate the forward far-end crosstalk noise by use of a simple construction.

Still another object of the present invention is to provide a transmission circuit having at least two distributed constant lines for transmitting signals two ways, and driving sources of the signals on both end of the lines, characterized in that a terminating resistor is coupled to a far-end of the distributed constant lines with respect to each driving source, and the terminating resistor has a terminating resistance which is set so that an approximately reciprocal relationship exists between the terminating resistance which is normalized by a characteristic impedance of the line and an internal resistance of the driving source which is normalized by the characteristic impedance of the line. According to the present invention, it is possible to effectively eliminate the forward far-end crosstalk noise by use of a simple construction.

A further object of the present invention is to provide a transmission circuit coupled to at least two distributed constant lines for transmitting signals in the same direction, characterized by a terminating resistor coupled to a far-end of the distributed constant lines to reduce a far-end crosstalk noise. According to the present invention, it is possible to effectively eliminate the forward far-end crosstalk noise by use of a simple construction.

Another object of the present invention is to provide a transmission circuit coupled to at least two distributed constant lines for transmitting signals in the same direction, characterized by a terminating resistor having a resistance which makes voltages propagated on the distributed constant lines equal between a common mode and a differential mode. According to the present invention, it is possible to effectively eliminate the forward far-end crosstalk noise by use of a simple construction.

Other objects and further features of the present invention will be apparent from the following detailed description when read in conjunction with the accompanying drawings.

BRIEF DESCRIPTION OF THE DRAWINGS

FIG. 20 is a diagram showing the relationship of the magnitude of a resistance R when a terminating resistor is changed with respect to an optimum value and a forward far-end crosstalk reduction;

DESCRIPTION OF THE PREFERRED EMBODIMENTS

First, a description will be given of the operating principle of the present invention.

It is both extremely difficult and complicated to solve the crosstalk noise by mathematical formulas. However, the present inventor positively used mathematical formulas and found that the crosstalk noise generated at a far-end can be made zero theoretically, by selecting a terminating resistance at the far-end to an optimum value.

Figure 3:
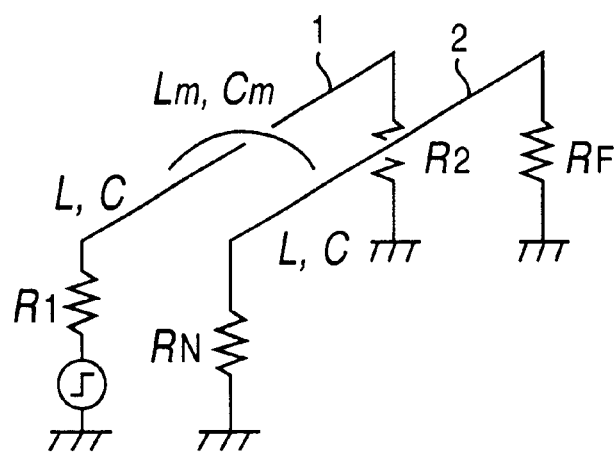
FIG. 3 is a diagram showing a coupling distributed constant line for explaining the operating principle of the present invention.

Two coupling distributed constant lines shown in FIG. 3 are considered, and signal propagations on lines 1 and 2 are solved by Laplace transform based on basic formulas of transmission. Inductances and capacitances of the lines 1 and 2 are taken into consideration as parameters between the lines 1 and 2. The inductances and the capacitances of the lines 1 and 2 themselves will be referred to as self inductances and self capacitances, and are respectively denoted by $L_{11}$ and $C_{11}$ with respect to the line 1 and by $L_{22}$ and $C_{22}$ with respect to the line 2. In addition, the inductance and the capacitance between the lines 1 and 2 will be referred to as a mutual inductance and a mutual capacitance, and are respectively denoted by $L_{12}$ and $C_{12}$.

In this case, the basic formulas of the transmission can be described by the following formulas (1) by taking L and C as matrixes, where $v_1$ denotes a voltage propagating on the line 1, and $v_2$ denotes a voltage propagating on the line 2.

$$-\frac{\partial}{\partial x}\begin{pmatrix} v_1 \\ v_2 \end{pmatrix} = \frac{\partial}{\partial t}\begin{pmatrix} L_{11} & L_{12} \\ L_{21} & L_{22} \end{pmatrix}\begin{pmatrix} i_1 \\ i_2 \end{pmatrix}, -\frac{\partial}{\partial x}\begin{pmatrix} i_1 \\ i_2 \end{pmatrix} = \frac{\partial}{\partial t}\begin{pmatrix} C_{11} & C_{12} \\ C_{21} & C_{22} \end{pmatrix}\begin{pmatrix} v_1 \\ v_2 \end{pmatrix} \quad (1)$$

The following formula (2) is obtained by subjecting the above formulas (1) to a Laplace transform so as to describe the formula (2) solely in terms of V.

$$\frac{d^2}{dx^2}\begin{pmatrix} V_1 \\ V_2 \end{pmatrix} - s^2\begin{pmatrix} L_{11} & L_{12} \\ L_{21} & L_{22} \end{pmatrix}\begin{pmatrix} C_{11} & C_{12} \\ C_{21} & C_{22} \end{pmatrix}\begin{pmatrix} V_1 \\ V_2 \end{pmatrix} = 0 \quad (2)$$

In order to simplify matters, it will be assumed for the sake of convenience that the lines 1 and 2 shown in FIG. 3 have the same characteristic, and that the following relationships stand.

$L_{11}=L_{22}=L$ $L_{12}=L_{21}=L_m$ $C_{11}=C_{22}=C$ $C_{12}=C_{21}=C_m$

In this case, a coefficient matrix of the second term in the formula (2) can be described by the following formula (3).

$$\begin{pmatrix} L_{11} & L_{12} \\ L_{21} & L_{22} \end{pmatrix}\begin{pmatrix} C_{11} & C_{12} \\ C_{21} & C_{22} \end{pmatrix} = \begin{pmatrix} L & L_m \\ L_m & L \end{pmatrix}\begin{pmatrix} C & C_m \\ C_m & C \end{pmatrix} = \begin{pmatrix} LC+L_mC_m & LC_m+L_mC \\ LC_m+L_mC & LC+L_mC_m \end{pmatrix} = \frac{1}{u^2}\begin{pmatrix} 1 & \xi \\ \xi & 1 \end{pmatrix} \quad (3)$$

Here, the following formula (4) stands.

$$\xi = \left(\frac{L_m}{L}+\frac{C_m}{C}\right)\bigg/\left(1+\frac{L_mC_m}{LC}\right) \quad (4)$$

$$u^2 = \frac{1}{LC+L_mC_m}$$

The following formula (5) is obtained by eliminating $V_2$.

$$\frac{d^4V_1}{dx^4} - 2\left(\frac{s}{u}\right)^2\frac{d^2V_1}{dx^2} + \left(\frac{s}{u}\right)^4(1-\xi^2)V_1 = 0 \quad (5)$$

The following formula (6) can be obtained by describing the coefficient as a function of D.

$$\phi(D) = D^4 - 2\left(\frac{s}{u}\right)^2 D^2 + \left(\frac{s}{u}\right)^4(1-\xi^2) \quad (6)$$

The root of $\phi=(D)$ can be described by the following formula (7).

$$D = \pm\frac{s}{u}\sqrt{1\pm\xi} \qquad \text{(composite arbitrary)} \quad (7)$$

When the following formula (8) is substituted into the formula (7), the following formula (9) can be obtained, where the suffixes "C" and "D" respectively indicate a common (or also called even) mode and a differential (or also called odd) mode, $u_C$ and $u_D$ denote propagation velocities in the respective modes.

$$u_C = 1/\sqrt{(L+L_m)(C+C_m)}, u_D = 1/\sqrt{(L-L_m)(C-C_m)} \quad (8)$$

$$D = \pm\frac{s}{u_C}, \pm\frac{s}{u_D} \quad (9)$$

Impedances $Z_C$ and $Z_D$ also exist in the common mode and the differential mode, respectively, with respect to the specific impedance as indicated by the following formulas (10).

$$Z_C = \sqrt{\frac{L+L_m}{C+C_m}}, Z_D = \sqrt{\frac{L-L_m}{C-C_m}} \quad (10)$$

When the currents and voltages are obtained, the following formulas (11) are obtained.

$$V_1(s) = A_1(s)e^{-\frac{x}{u_C}s} + A_2(s)e^{\frac{x}{u_C}s} + A_3(s)e^{-\frac{x}{u_D}s} + A_4(s)e^{\frac{x}{u_D}s} \quad (11)$$

$$V_2(s) = A_1(s)e^{-\frac{x}{u_C}s} + A_2(s)e^{\frac{x}{u_C}s} - A_3(s)e^{-\frac{x}{u_D}s} - A_4(s)e^{\frac{x}{u_D}s}$$

$$I_1(s) = \frac{A_1(s)}{Z_C}e^{-\frac{x}{u_C}s} - \frac{A_2(s)}{Z_C}e^{\frac{x}{u_C}s} + \frac{A_3(s)}{Z_D}e^{-\frac{x}{u_D}s} - \frac{A_4(s)}{Z_D}e^{\frac{x}{u_D}s}$$

$$I_2(s) = \frac{A_1(s)}{Z_C}e^{-\frac{x}{u_C}s} - \frac{A_2(s)}{Z_C}e^{\frac{x}{u_C}s} - \frac{A_3(s)}{Z_D}e^{-\frac{x}{u_D}s} + \frac{A_4(s)}{Z_D}e^{\frac{x}{u_D}s}$$

Under a boundary condition x=0, the following relationships exist.

$V_1=V_0-R_1I_1, V_2=-R_NI_2$

On the other hand, the following relationships exist under a boundary condition x=1.

$V_1=R_2I_1, V_2=R_FI_2$

The following formulas (12) are simultaneous equations for $A_1$ through $A_4$, and $V_1$ and $V_2$ can be obtained by solving the simultaneous equations and substituting the solutions into the original formulas (11). When the obtained $V_1$ and $V_2$ are subjected to a Laplace inverse transform, temporal functions $v_1(t)$ and $v_2(t)$ are obtained. These results are also a combination of a linear operator and a time lag, and can be obtained by simple calculations similarly as described above.

$$A_1 + A_2 + A_3 + A_4 = V_0 - R_1\left(\frac{A_1}{Z_C} - \frac{A_2}{Z_C} + \frac{A_3}{Z_D} - \frac{A_4}{Z_D}\right) \quad (12)$$

$$A_1 + A_2 - A_3 - A_4 = -R_N\left(\frac{A_1}{Z_C} - \frac{A_2}{Z_C} - \frac{A_3}{Z_D} + \frac{A_4}{Z_D}\right)$$

$$A_1 e^{-\tau_C s} + A_2 e^{\tau_C s} + A_3 e^{-\tau_D s} + A_4 e^{\tau_D s} = R_2\left(\frac{A_1}{Z_C}e^{-\tau_C s} - \frac{A_2}{Z_C}e^{\tau_C s} + \frac{A_3}{Z_D}e^{-\tau_D s} - \frac{A_4}{Z_D}e^{\tau_D s}\right)$$

$$A_1 e^{-\tau_C s} + A_2 e^{\tau_C s} - A_3 e^{-\tau_D s} - A_4 e^{\tau_D s} = R_F\left(\frac{A_1}{Z_C}e^{-\tau_C s} - \frac{A_2}{Z_C}e^{\tau_C s} - \frac{A_3}{Z_D}e^{-\tau_D s} + \frac{A_4}{Z_D}e^{\tau_D s}\right)$$

$$\left(1+\frac{R_1}{Z_C}\right)A_1 + \left(1-\frac{R_1}{Z_C}\right)A_2 + \left(1+\frac{R_1}{Z_D}\right)A_3 + \left(1-\frac{R_1}{Z_D}\right)A_4 = V_0$$

$$\left(1+\frac{R_N}{Z_C}\right)A_1 + \left(1-\frac{R_N}{Z_C}\right)A_2 - \left(1+\frac{R_N}{Z_D}\right)A_3 - \left(1-\frac{R_N}{Z_D}\right)A_4 = 0$$

$$\left(1-\frac{R_2}{Z_C}\right)e^{-\tau_C s}A_1 + \left(1+\frac{R_2}{Z_C}\right)e^{\tau_C s}A_2 + \left(1-\frac{R_2}{Z_D}\right)e^{-\tau_D s}A_3 + \left(1+\frac{R_2}{Z_D}\right)e^{\tau_D s}A_4 = 0$$

$$\left(1-\frac{R_F}{Z_C}\right)e^{-\tau_C s}A_1 + \left(1+\frac{R_F}{Z_C}\right)e^{\tau_C s}A_2 - \left(1-\frac{R_F}{Z_D}\right)e^{-\tau_D s}A_3 - \left(1+\frac{R_F}{Z_D}\right)e^{\tau_D s}A_4 = 0$$

When these results are considered as a function of x, $e^{-(x/u_C)s}$, for example, means carrying out an operation $f(t-x/u_C)$ with respect to the temporal function f(t). Since $x/u_C$ describes the time it takes to travel the distance x at the velocity $u_C$, it is a waveform propagating in the x direction. Similarly, it may be seen that a waveform propagating in a direction opposite to the x direction is a composed of signals propagating at the velocities $u_C$ and $u_D$.

Hence, the following formula (13) can be obtained, and the following formula (14) can be obtained by denoting the coefficient matrix equation by $\Delta$.

$$\begin{pmatrix} \left(1+\frac{R_1}{Z_C}\right) & \left(1-\frac{R_1}{Z_C}\right) & \left(1+\frac{R_1}{Z_D}\right) & \left(1-\frac{R_1}{Z_D}\right) \\ \left(1+\frac{R_N}{Z_C}\right) & \left(1-\frac{R_N}{Z_C}\right) & -\left(1+\frac{R_N}{Z_D}\right) & -\left(1-\frac{R_N}{Z_D}\right) \\ \left(1-\frac{R_2}{Z_C}\right)e^{-\tau_C s} & \left(1+\frac{R_2}{Z_C}\right)e^{\tau_C s} & \left(1-\frac{R_2}{Z_D}\right)e^{-\tau_D s} & \left(1+\frac{R_2}{Z_D}\right)e^{\tau_D s} \\ \left(1-\frac{R_F}{Z_C}\right)e^{-\tau_C s} & \left(1+\frac{R_F}{Z_C}\right)e^{\tau_C s} & -\left(1-\frac{R_F}{Z_D}\right)e^{-\tau_D s} & -\left(1+\frac{R_F}{Z_D}\right)e^{\tau_D s} \end{pmatrix} \begin{pmatrix} A_1 \\ A_2 \\ A_3 \\ A_4 \end{pmatrix} = \begin{pmatrix} V_0 \\ 0 \\ 0 \\ 0 \end{pmatrix} \quad (13)$$

$$\begin{aligned}
\Delta &= \begin{vmatrix} \left(1+\frac{R_1}{Z_C}\right) & \left(1-\frac{R_1}{Z_C}\right) & \left(1+\frac{R_1}{Z_D}\right) & \left(1-\frac{R_1}{Z_D}\right) \\ \left(1+\frac{R_N}{Z_C}\right) & \left(1-\frac{R_N}{Z_C}\right) & -\left(1+\frac{R_N}{Z_D}\right) & -\left(1-\frac{R_N}{Z_D}\right) \\ \left(1-\frac{R_2}{Z_C}\right)e^{-\tau_C s} & \left(1+\frac{R_2}{Z_C}\right)e^{\tau_C s} & \left(1-\frac{R_2}{Z_D}\right)e^{-\tau_D s} & \left(1+\frac{R_2}{Z_D}\right)e^{\tau_D s} \\ \left(1-\frac{R_F}{Z_C}\right)e^{-\tau_C s} & \left(1+\frac{R_F}{Z_C}\right)e^{\tau_C s} & -\left(1-\frac{R_F}{Z_D}\right)e^{-\tau_D s} & -\left(1+\frac{R_F}{Z_D}\right)e^{\tau_D s} \end{vmatrix} \\
&= \Big[-\Big\{2\Big(1+\frac{R_1 R_N}{Z_C Z_D}\Big)+(R_1+R_N)\Big(\frac{1}{Z_C}+\frac{1}{Z_D}\Big)\Big\} \times \Big\{2\Big(1+\frac{R_2 R_F}{Z_C Z_D}\Big)+(R_2+R_F)\Big(\frac{1}{Z_C}+\frac{1}{Z_D}\Big)\Big\} + \\
&\quad \Big\{2\Big(1-\frac{R_1 R_N}{Z_C Z_D}\Big)+(R_1+R_N)\Big(\frac{1}{Z_C}-\frac{1}{Z_D}\Big)\Big\} \times \Big\{2\Big(1-\frac{R_2 R_F}{Z_C Z_D}\Big)+(R_2+R_F)\Big(\frac{1}{Z_C}-\frac{1}{Z_D}\Big)\Big\} e^{-2\tau_D s} + \\
&\quad \frac{8(R_1-R_N)(R_2-R_F)}{Z_C Z_D} e^{-(\tau_C+\tau_D)s} + \Big\{2\Big(1-\frac{R_1 R_N}{Z_C Z_D}\Big)-(R_1+R_N)\Big(\frac{1}{Z_C}-\frac{1}{Z_D}\Big)\Big\} \times \\
&\quad \Big\{2\Big(1-\frac{R_2 R_F}{Z_C Z_D}\Big)-(R_2+R_F)\Big(\frac{1}{Z_C}-\frac{1}{Z_D}\Big)\Big\} e^{-2\tau_C s} - \Big\{2\Big(1+\frac{R_1 R_N}{Z_C Z_D}\Big)-(R_1+R_N)\Big(\frac{1}{Z_C}+\frac{1}{Z_D}\Big)\Big\} \times \\
&\quad \Big\{2\Big(1+\frac{R_2 R_F}{Z_C Z_D}\Big)-(R_2+R_F)\Big(\frac{1}{Z_C}+\frac{1}{Z_D}\Big)\Big\} e^{-(2\tau_C+2\tau_D)s}\Big] e^{(\tau_C+\tau_D)s}
\end{aligned} \quad (14)$$

Based on the above, the unknowns A1, A2, A3 and A4 can be obtained by the following formulas (15).

$$A_1 = \frac{V_0}{\Delta}\left[-\left(1+\frac{R_N}{Z_D}\right)\left\{2\left(1+\frac{R_2 R_F}{Z_C Z_D}\right)+(R_2+R_F)\left(\frac{1}{Z_C}+\frac{1}{Z_D}\right)\right\}+ \right.$$
$$\left(1-\frac{R_N}{Z_D}\right)\left\{2\left(1-\frac{R_2 R_F}{Z_C Z_D}\right)+(R_2+R_F)\left(\frac{1}{Z_C}-\frac{1}{Z_D}\right)\right\}e^{-2\tau_D s}+$$
$$\left. 2\left(1-\frac{R_N}{Z_C}\right)\frac{R_2-R_F}{Z_D}e^{-(\tau_C+\tau_D)s}\right]e^{(\tau_C+\tau_D)s}$$

$$A_2 = \frac{V_0}{\Delta}\left[-2\left(1+\frac{R_N}{Z_C}\right)\frac{R_2-R_F}{Z_D}e^{-(\tau_C+\tau_D)s}+ \right.$$
$$\left(1+\frac{R_N}{Z_D}\right)\left\{2\left(1-\frac{R_2 R_F}{Z_C Z_D}\right)-(R_2+R_F)\left(\frac{1}{Z_C}-\frac{1}{Z_D}\right)\right\}e^{-2\tau_C s}-$$
$$\left. \left(1-\frac{R_N}{Z_D}\right)\left\{2\left(1+\frac{R_2 R_F}{Z_C Z_D}\right)-(R_2+R_F)\left(\frac{1}{Z_C}+\frac{1}{Z_D}\right)\right\}e^{-(2\tau_C+2\tau_D)s}\right]e^{(\tau_C+\tau_D)s}$$

$$A_3 = \frac{V_0}{\Delta}\left[-\left(1+\frac{R_N}{Z_C}\right)\left\{2\left(1+\frac{R_2 R_F}{Z_C Z_D}\right)+(R_2+R_F)\left(\frac{1}{Z_C}+\frac{1}{Z_D}\right)\right\}+ \right.$$
$$2\left(1-\frac{R_N}{Z_D}\right)\frac{R_2-R_F}{Z_C}e^{-(\tau_C+\tau_D)s}+$$
$$\left. \left(1-\frac{R_N}{Z_C}\right)\left\{2\left(1-\frac{R_2 R_F}{Z_C Z_D}\right)-(R_2+R_F)\left(\frac{1}{Z_C}-\frac{1}{Z_D}\right)\right\}e^{-2\tau_C s}\right]e^{(\tau_C+\tau_D)s}$$

$$A_4 = \frac{V_0}{\Delta}\left[\left(1+\frac{R_N}{Z_C}\right)\left\{2\left(1-\frac{R_2 R_F}{Z_C Z_D}\right)+(R_2+R_F)\left(\frac{1}{Z_C}-\frac{1}{Z_D}\right)\right\}e^{-2\tau_D s}- \right.$$
$$2\left(1+\frac{R_N}{Z_D}\right)\frac{R_2-R_F}{Z_C}e^{-(\tau_C+\tau_D s)}-$$
$$\left. \left(1-\frac{R_N}{Z_C}\right)\left\{2\left(1+\frac{R_2 R_F}{Z_C Z_D}\right)-(R_2+R_F)\left(\frac{1}{Z_C}+\frac{1}{Z_D}\right)\right\}e^{-(2\tau_C+2\tau_D)s}\right]e^{(\tau_C+\tau_D)s}$$

(15)

When obtaining the forward far-end crosstalk, the resistances of the resistors shown in FIG. 3 are set to $R_1 = r$, $R_2 = R$, $R_N = r$ and $R_F = R$ in the following formulas (16) and (17) for the sake of convenience to simplify matters. In addition, a common one-way time $\tau_C$ and a differential one-way time $\tau_D$ are both denoted by $\tau$, that is, it is assumed that $\tau_C = \tau_D = \tau$.

$$\Delta = -\left\{2\left(1+\frac{R_1 R_N}{Z_C Z_D}\right)+(R_1+R_N)\left(\frac{1}{Z_C}+\frac{1}{Z_D}\right)\right\} \times$$
$$\left\{2\left(1+\frac{R_2 R_F}{Z_C Z_D}\right)+(R_2+R_F)\left(\frac{1}{Z_C}+\frac{1}{Z_D}\right)\right\}$$
$$= -4\left\{\left(1+\frac{r^2}{Z_C Z_D}\right)+r\left(\frac{1}{Z_C}+\frac{1}{Z_D}\right)\right\}\left\{\left(1+\frac{R^2}{Z_C Z_D}\right)+R\left(\frac{1}{Z_C}+\frac{1}{Z_D}\right)\right\}$$
$$= -4\left(1+\frac{r}{Z_C}\right)\left(1+\frac{r}{Z_D}\right)\left(1+\frac{R}{Z_C}\right)\left(1+\frac{R}{Z_D}\right)$$

(16)

$$A_1 e^{-\tau s} = \frac{V_0}{\Delta}\left[-\left(1+\frac{R_N}{Z_D}\right)\left\{2\left(1+\frac{R_2 R_F}{Z_C Z_D}\right)+(R_2+R_F)\left(\frac{1}{Z_C}+\frac{1}{Z_D}\right)\right\}\right]e^{-\tau s}$$
$$= -\frac{2V_0}{\Delta}\left(1+\frac{r}{Z_D}\right)\left\{\left(1+\frac{R^2}{Z_C Z_D}\right)+R\left(\frac{1}{Z_C}+\frac{1}{Z_D}\right)\right\}e^{-\tau s}$$

$$A_2 e^{\tau s} = \frac{V_0}{\Delta}\left[-2\left(1+\frac{R_N}{Z_C}\right)R_2-\frac{R_F}{Z_D}+ \right.$$
$$\left. \left(1+\frac{R_N}{Z_D}\right)\left\{2\left(1-\frac{R_2 R_F}{Z_C Z_D}\right)-(R_2+R_F)\left(\frac{1}{Z_C}-\frac{1}{Z_D}\right)\right\}\right]e^{-\tau s}$$
$$= \frac{2V_0}{\Delta}\left(1+\frac{r}{Z_D}\right)\left\{\left(1-\frac{R^2}{Z_C Z_D}\right)-R\left(\frac{1}{Z_C}-\frac{1}{Z_D}\right)\right\}e^{-\tau s}$$

$$(V_{2C}|)_{x=1,t=\tau} = A_1 e^{-\tau s}+A_2 e^{\tau s} = -\frac{4RV_0}{\Delta}\left(1+\frac{r}{Z_D}\right)\left(\frac{R}{Z_C Z_D}+\frac{1}{Z_C}\right)e^{-\tau s}$$

(17)

$$A_3 e^{-\tau s} = \frac{V_0}{\Delta}\left[-\left(1+\frac{R_N}{Z_C}\right)\left\{2\left(1+\frac{R_2 R_F}{Z_C Z_D}\right)+(R_2+R_F)\left(\frac{1}{Z_C}+\frac{1}{Z_D}\right)\right\}\right]e^{-\tau s}$$
$$= -\frac{2V_0}{\Delta}\left(1+\frac{r}{Z_C}\right)\left\{\left(1+\frac{R^2}{Z_C Z_D}\right)+R\left(\frac{1}{Z_C}+\frac{1}{Z_D}\right)\right\}e^{-\tau s}$$

-continued $$A_4 e^{\tau s} = \frac{V_0}{\Delta}\left(1 + \frac{R_N}{Z_C}\right)\left\{2\left(1 - \frac{R_2 R_F}{Z_C Z_D}\right) + (R_2 + R_F)\left(\frac{1}{Z_C} - \frac{1}{Z_D}\right)\right\} e^{-\tau s}$$

$$= \frac{2V_0}{\Delta}\left(1 + \frac{r}{Z_C}\right)\left\{\left(1 - \frac{R^2}{Z_C Z_D}\right) + R\left(\frac{1}{Z_C} - \frac{1}{Z_D}\right)\right\} e^{-\tau s}$$

$$(V_{2D}|)_{x=1, t=\tau} = -A_3 e^{-\tau s} - A_4 e^{\tau s} = \frac{4RV_0}{\Delta}\left(1 + \frac{r}{Z_C}\right)\left(\frac{R}{Z_C Z_D} + \frac{1}{Z_D}\right) e^{-\tau s}$$

$$\left(((V_2|)_{x=1, t=\tau} = V_{2C}|)_{x=1, t=\tau} + V_{2D}|)_{x=1, t=\tau}\right) = \frac{4RV_0}{\Delta}\left\{\left(1 - \frac{Rr}{Z_C Z_D}\right)\left(\frac{1}{Z_D} - \frac{1}{Z_C}\right)\right\} e^{-\tau s}$$

$$= \frac{R\left(\frac{1}{Z_D} - \frac{1}{Z_C}\right)\left(\frac{Rr}{Z_C Z_D} - 1\right)}{\left(1 + \frac{r}{Z_C}\right)\left(1 + \frac{r}{Z_D}\right)\left(1 + \frac{R}{Z_C}\right)\left(1 + \frac{R}{Z_D}\right)} e^{-\tau s} V_0$$

Accordingly, it can be seen that the forward far-end crosstalk becomes zero when $(Rr)/(Z_C Z_D)=1$. But since each of $Z_C$ and $Z_D$ is equal to a square of the characteristic impedance $Z_0$ of the other when one of the coupling distributed constant lines 1 and 2 is terminated by a matched termination, the following relationship stands.

$R/Z_0 = Z_0/r$

In other words, when normalized by the characteristic impedance of the line, a reciprocal relationship exists between the resistance at the near-end and the terminating resistance at the far-end.

Figure 4:
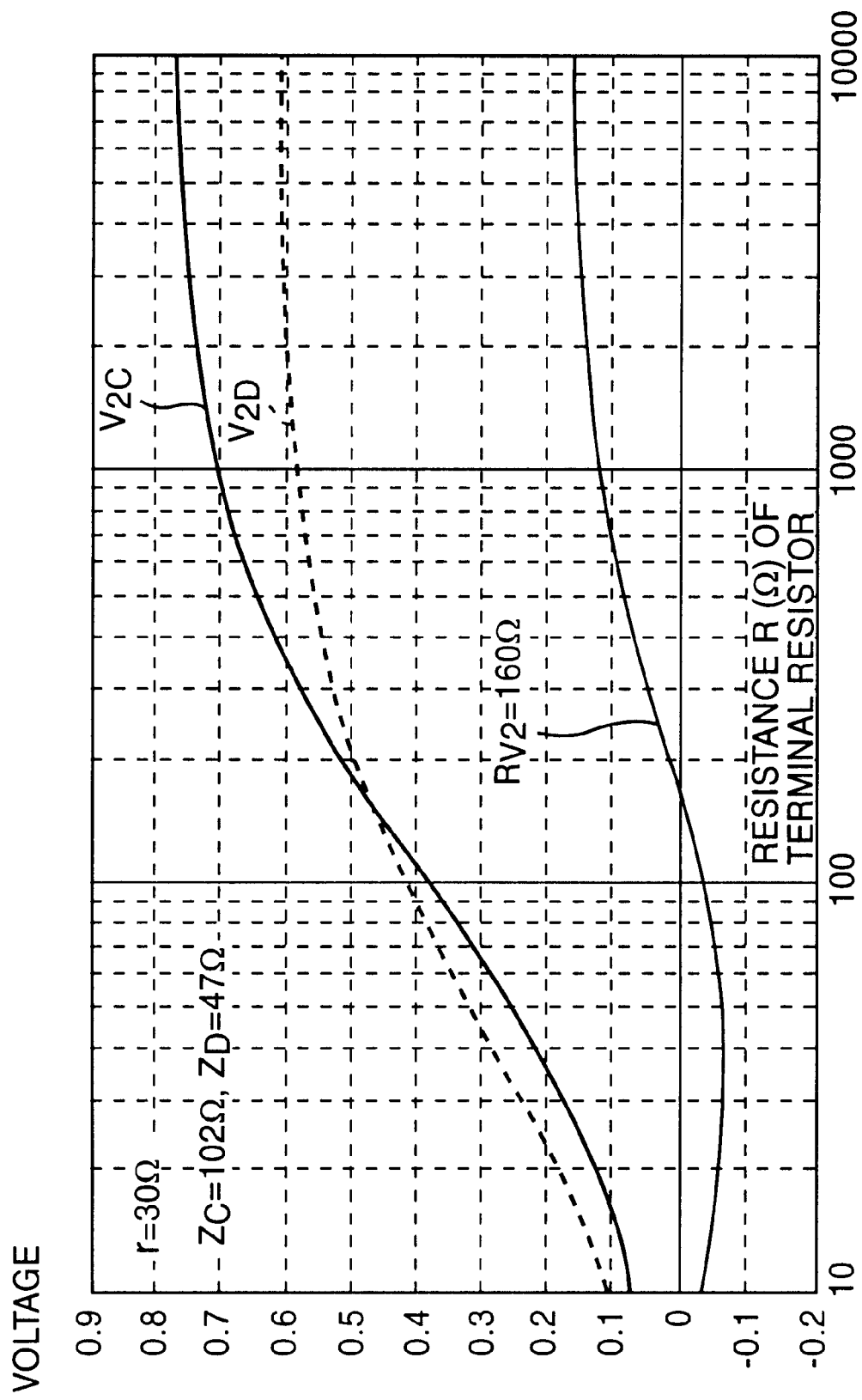
FIG. 4 is a diagram showing signal changes caused by a terminating resistor at a far-end in a common mode and a differential mode.

FIG. 4 is a diagram showing signal changes caused by the terminating resistor at the far-end in the common mode and the differential mode. In FIG. 4, the ordinate indicates the voltage in arbitrary units, and the abscissa indicates the resistance R in $\Omega$. In addition, $V_{2C}$ indicates a voltage propagating on the line 2 in the common mode, $V_{2D}$ indicates the voltage propagating on the line 2 in the differential mode, $V_2$ indicates a forward far-end crosstalk noise, that is, the crosstalk noise generated in the line 2. As may be seen from FIG. 4, the voltage $V_{2C}$ in the common mode and the voltage $V_{2D}$ in the differential mode change depending on the resistance R of the terminating resistor at the far-end, and a point exists where $V_{2C}=V_{2D}$. Since r=30$\Omega$, $Z_C=102\Omega$, $Z_D=47\Omega$ in FIG. 4, $V_{2C}=V_{2D}$ at the point where R=160$\Omega$.

Therefore, by setting the resistance R of the terminating resistor to $R=Z_0^2/r$, the forward far-end crosstalk value theoretically becomes zero. Of course, it is not essential from the practical point of view that the crosstalk value is exactly equal to zero. As will be described later, the inventor has found that sufficient effects are obtainable when the resistance R of the terminating resistor increases or decreases by approximately 50 to 30% with respect to the maximum value of $Z_0^2/r$.

Figure 5A:
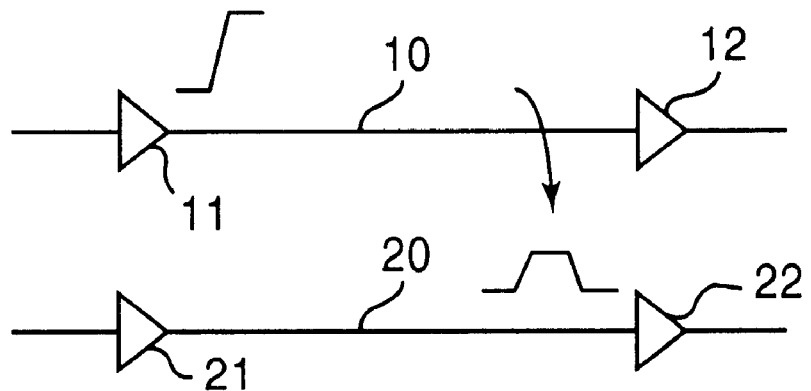
FIGS. 5A and 5B respectively are diagrams for explaining elimination of a forward far-end crosstalk noise in a first embodiment of the present invention.
Figure 5B:
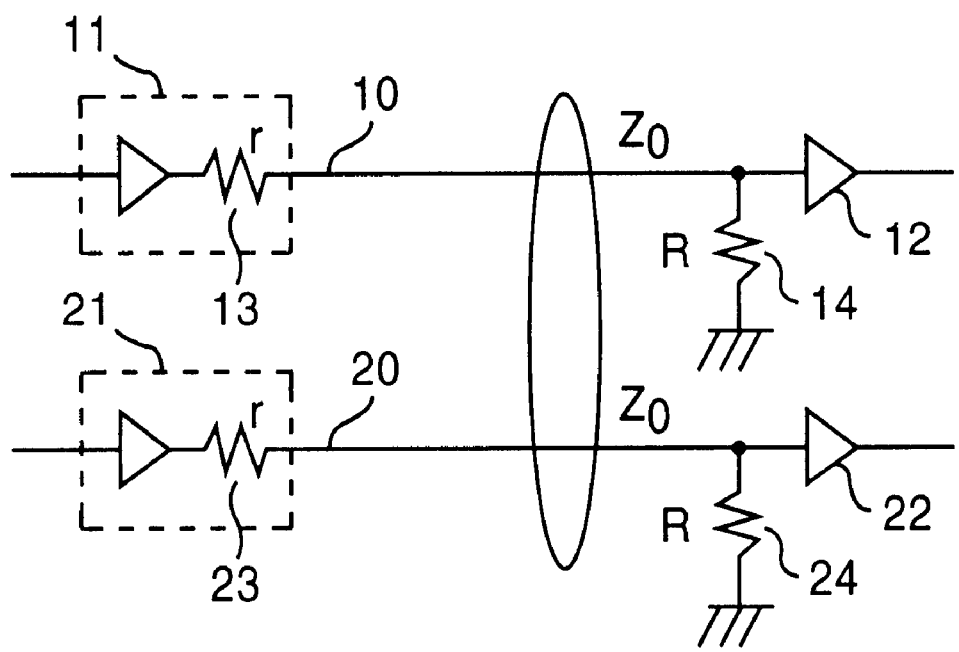

FIGS. 5A and 5B respectively are diagrams for explaining the elimination of the forward far-end crosstalk noise in a first embodiment of the present invention. FIG. 5A shows a driving line 10, a driver (driving source) 11, a receiver 12, a passive line 20, a driver (driving source) 21, and a receiver 22. FIG. 5B additionally shows an internal resistance 13 of the driver 11, a terminating resistor 14, an internal resistance 23 of the driver 21, and a terminating resistor 24.

When signals are transmitted in the same direction on the two lines 10 and 20 which are close to each other as shown in FIG. 5A, the forward far-end crosstalk refers to the noise which is generated by the signal on the driving line 10 on the side of the receiver 22 on the other passive line 20.

When the value of the internal resistance 13 of the driver 11 which is the driving source is denoted by r, the characteristic impedance of the driving line 10 and the passive line 20 is denoted by $Z_0$, and the value of the terminating resistor 24 connected at the far-end of the passive line 20 is denoted by R, the value R is set so as to satisfy $R=Z_0^2/r$. In this case, it is possible to make the forward far-end crosstalk value theoretically zero.

Figure 6:
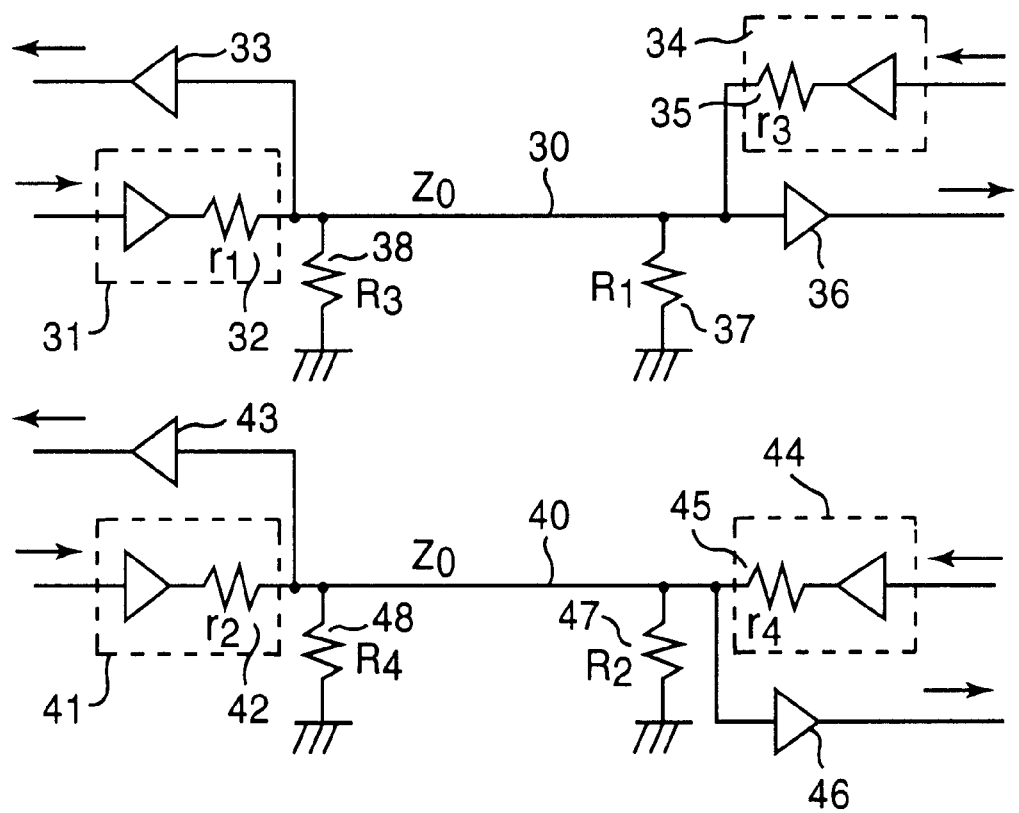
FIG. 6 is a diagram for explaining the elimination of the forward far-end crosstalk noise in a second embodiment of the present invention.

FIG. 6 is a diagram for explaining the elimination of the forward far-end crosstalk noise in a second embodiment of the present invention. In FIG. 6, signal transmissions on distributed constant lines 30 and 40 can be made from both the left to right and from the right to left. In FIG. 6, the reference numerals 31, 34, 41 and 44 indicate drivers (driving sources), the reference numerals 33, 36, 43 and 46 indicate receivers, the reference numerals 32, 35, 42 and 45 indicate internal resistances of the drivers 31, 34, 41 and 44, and the reference numerals 37, 38, 47 and 48 indicate terminal resistors.

In this second embodiment, the first embodiment described above is expanded to the two-way transmission. A case will now be considered where the signal is transmitted from the left to right in FIG. 6. In this case, the drivers 34 and 44 are set to a high impedance state. When the signal line 30 is regarded as a driving line and the signal line 40 is regarded as a passive line, the circuit construction becomes similar to that shown in FIG. 5B. Accordingly, when the characteristic impedance of the signal lines 30 and 40 is denoted by $Z_0$, the far-end crosstalk noise can be eliminated by setting a value $R_1$ of the terminal resistor 37 so as to satisfy $R_1=Z_0^2/r_1$, where $r_1$ denotes the value of the internal resistance 32 of the driver 31.

On the other hand, when the signal line 40 is regarded as a driving line and the signal line 30 is regarded as a passive line, the far-end crosstalk noise on the signal line 30 due to the signal line 40 can be eliminated by setting a value $R_2$ of the terminal resistor 47 so as to satisfy $R_2=Z_0^2/r_2$, where $r_2$ denotes the value of the internal resistance 42 of the driver 41. In addition, in order to eliminate the far-end crosstalk noise when making a signal transmission in a reverse direction, from the right to left, values $R_3$ and $R_4$ of the terminal resistors 38 and 39 which are connected are set so as to respectively satisfy $R_3=Z_0^2/r_3$ and $R_4=Z_0^2/r_4$, where r3 and r4 respectively denote the values of the internal resistances 35 and 45 of the drivers 34 and 44.

FIGS. 7A through 7E and FIGS. 8A and 8B are diagrams showing embodiments of the terminal resistor.

Figure 7A:
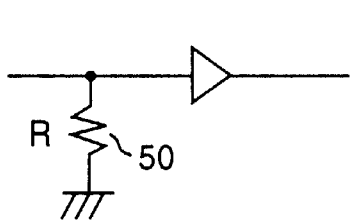
FIGS. 7A through 7E respectively are diagrams showing embodiments of the terminating resistor.

In FIG. 7A, one end of a terminating resistor 50 which is provided to eliminate the forward far-end crosstalk noise described above is grounded, and a terminating voltage is set to a logic amplitude "0". In this embodiment, only one terminating resistor 50 is required for each line, and the construction is simple. When this terminating resistor 50 is provided, there is an advantage in that no level change occurs on the "0" side of the original signal.

Figure 7B:
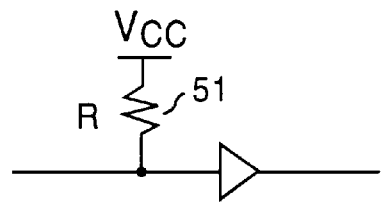

In FIG. 7B, one end of a terminating resistor 51 which is provided to eliminate the forward far-end crosstalk noise described above is connected to a power supply voltage Vcc, and a terminating voltage is set to a logic amplitude "1". In this embodiment, only one terminating resistor 51 is required for each line. When this terminating resistor 51 is provided, there is an advantage in that no level change occurs on the "1" side of the original signal.

Figure 7C:
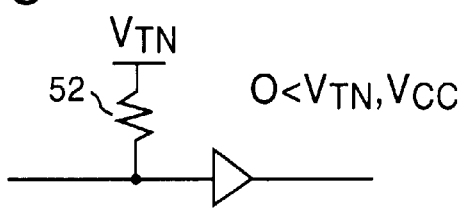

In FIG. 7C, one end of a terminating resistor 52 which is provided to eliminate the forward far-end crosstalk noise described above is connected to an intermediate voltage $V_{TH}$ between the logic amplitudes "0" and "1". This intermediate voltage $V_{TH}$ satisfies a relationship $0<V_{TH}<Vcc$, where Vcc is the power supply voltage. In this embodiment, only one terminating resistor 52 is required for each line. When this terminating resistor 52 is provided, a slight level change occurs on the "0" side and the "1" side of the original signal, but there is an advantage in that the symmetry of the waveform is maintained when the intermediate voltage $V_{TH}$ is selected exactly to the center between 0 and Vcc.

Figure 7D:
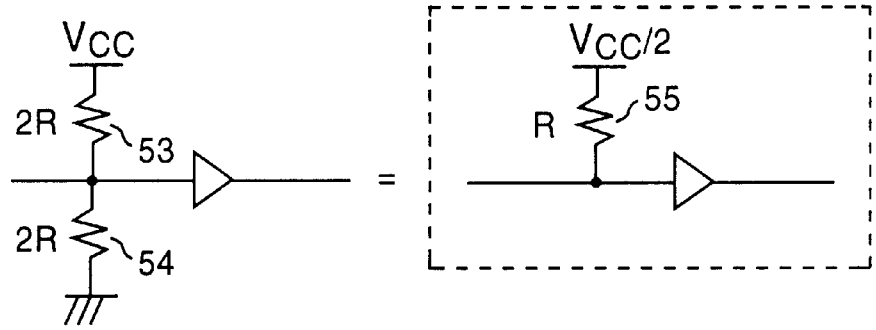

In FIG. 7D, the terminating resistor which is provided to eliminate the forward far-end crosstalk noise described above is formed by two resistors 53 and 54. One end of the resistor 53 is connected to the power supply voltage Vcc (that is, to the logic amplitude "1"), and one end of the resistor 54 is grounded (that is, connected to he logic amplitude "0"). A node connecting these resistors 53 and 54 is connected to the far-end of the line. When the resistances of the resistors 53 and 54 are respectively denoted by 2R, this circuit becomes equivalent to a circuit surrounded by a dotted line and shown on the right side in FIG. 7D. In the circuit surrounded by the dotted line, a resistor 55 having a resistance R is connected between the far-end and a voltage Vcc/2 which is ½ the power supply voltage Vcc. In this case, there is an advantage in that the circuit construction becomes equivalent to terminating to an intermediate voltage, without the need to prepare a terminating voltage.

Figure 7E:
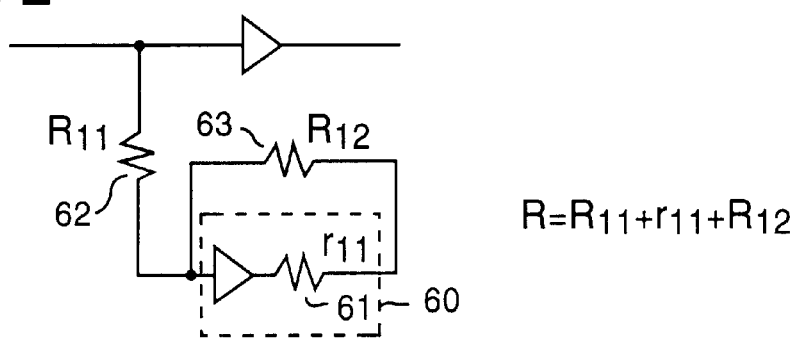

In FIG. 7E, the terminating resistor which is provided to eliminate the forward far-end crosstalk noise described above is formed by a non-inverting gate circuit 60. An input and an output of this non-inverting gate circuit 60 are connected directly or indirectly via a resistor 63 as shown. In addition, the far-end of the line and the input of the non-inverting gate circuit 60 are connected via a resistor 62. When the resistance of the resistor 62 is denoted by $R_{11}$, the resistance of the resistor 63 is denoted by $R_{12}$, and the output resistance of the non-inverting gate circuit 60 is denoted by $r_{11}$, the resistance R of the terminating resistor as a whole can be described by $R=R_{11}+r_{11}+R_{12}$.

When the line is simply terminated as in the above described embodiments shown in FIGS. 7A through 7D, the power consumption increases. However, by employing the construction of the embodiment shown in FIG. 7E, it is possible to eliminate the power consumption caused by the terminating resistor in the steady state. Furthermore, by selecting the output resistance $r_{11}$ of the non-inverting gate circuit 60 equal to the resistance R of the terminating resistor, it is possible to obtain an effect whereby the connections of the resistors 62 and 63 shown in FIG. 7E may be omitted. In addition, by employing the construction in which the input of the non-inverting gate circuit 60 is not directly connected to the line but is connected to the line through the resistor 62, the construction becomes strong against electrostatic discharge failure, and the waveform will not be distorted by the electrostatic capacitance of the non-inverting gate circuit 60.

Figure 8A:
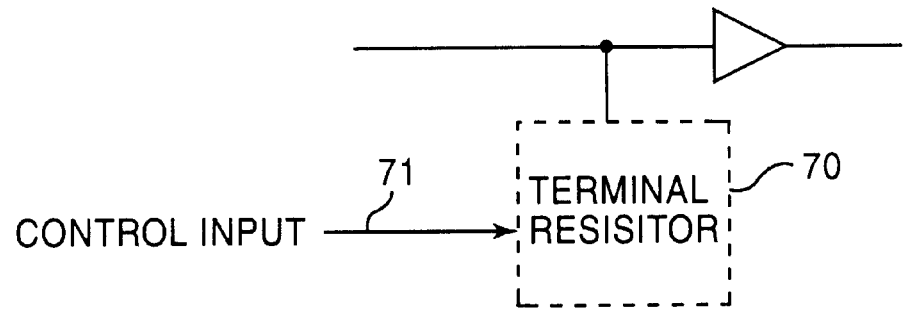
FIGS. 8A and 8B respectively are diagrams showing embodiments of the terminating resistor.

In FIG. 8A, the resistance of a terminating resistor 70 which is provided to eliminate the forward far-end crosstalk noise described above is selectable by an external control input 71. When forming the circuit construction shown in FIG. 7E in the form of an integrated circuit, it is necessary to use different parts such that the resistance of the terminating resistor is different depending on the drivability of the driver. But by providing a plurality of kinds of resistances and making one of the resistances selectable depending on the control input 71, it becomes possible to use only one kind of part and cope with the different drivability of the driver. In addition, even in a case where a resistor (damping resistor) is inserted in series with espect to the driver after the circuit is constructed and the equivalent internal resistance of the driving source changes, it is unnecessary to change the part, and it becomes possible to realize an optimum noise elimination by simply changing the setting by the control input 71.

Figure 8B:
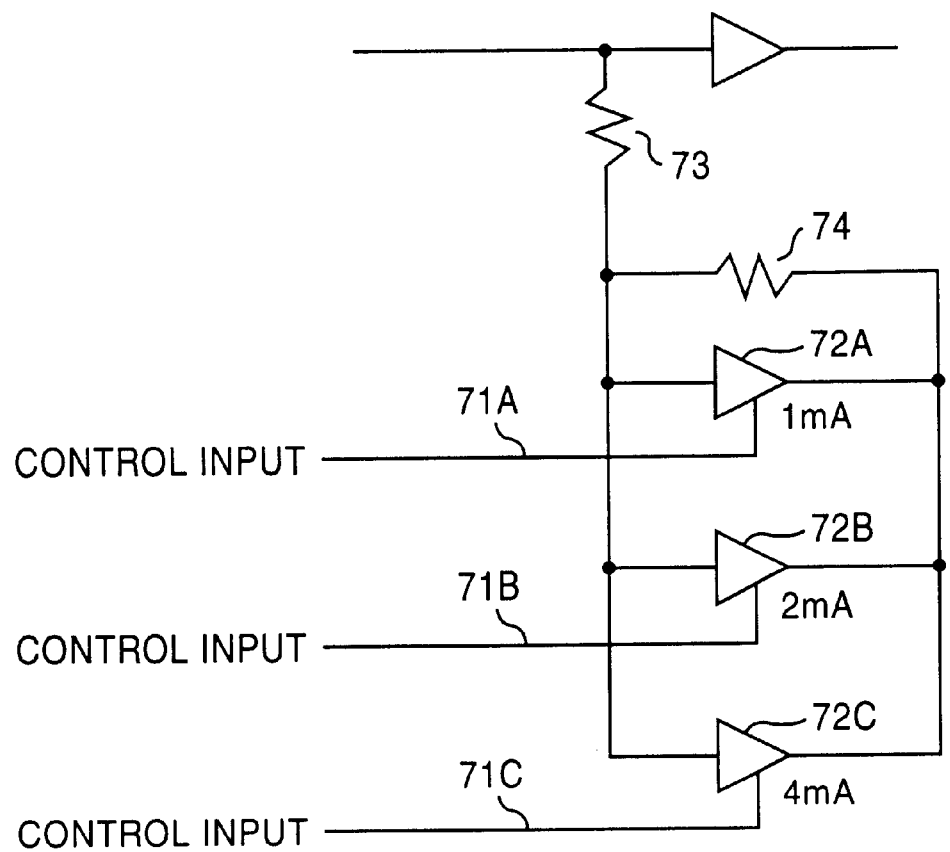

FIG. 8B shows an embodiment of the construction for varying the resistance of the terminating resistor 70 shown in FIG. 8A depending on the control input 71. In FIG. 8B, outputs of tristate gates 72A through 72C can be controlled to a high impedance state or an active state, based respectively on control inputs 71A through 71C. If it is assumed that drivabilities of 1 mA, 2 mA and 4 mA are respectively obtained when the tristate gates 72A through 72C are active, it is possible to obtain resistances depending on the currents of 1 mA to 7 mA, based on a combination of the control inputs 71A through 71C. Of course, the circuit construction for making the resistance of the terminating resistor variable is not limited to the circuit construction shown in FIG. 8B.

FIGS. 9 through 13 are diagrams showing analyzed results of the forward far-end crosstalk.

Figure 9:
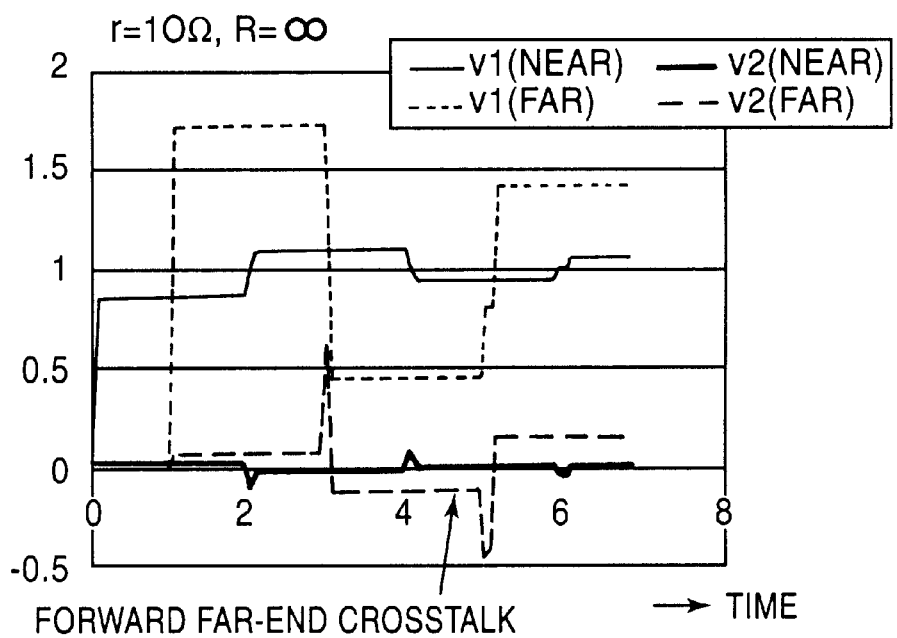
FIG. 9 is a diagram showing an analyzed result of the forward far-end crosstalk.

FIG. 9 shows signal waveforms appearing at the near-end and the far-end of the driving line 10 and the passive line 20 of the transmission circuit shown in FIG. 5B, in a case where the value r of the internal resistance 13 of the driver 11 is 10Ω and the resistance R of the terminating resistor 24 is infinitely large, that is, when the terminating resistor 24 is not connected. The drivability of the driver 11 is approximately 24 mA, and the characteristic impedance $Z_0$ of the driving line 10 and the passive line 20 is 69Ω.

In FIG. 9, the ordinate indicates the magnitude of the voltage, and the abscissa indicates the time. In FIG. 9, a thin solid line v1(near) indicates a voltage change on the driving line 10 on the side of the driver 11 (near-end), a thin dotted line v1(far) indicates a voltage change on the driving line 10 on the side of the receiver 12 (far-end), a bold solid line v2(near) indicates a voltage change on the passive line 20 on the side of the driver 21 (near-end), and a bold dotted line v2(far) indicates a voltage change on the passive line 20 on the side of the receiver 22 (far-end). The same designations are used in FIGS. 10, 11, 12 and 13 which will be described hereinafter.

Figure 1A:
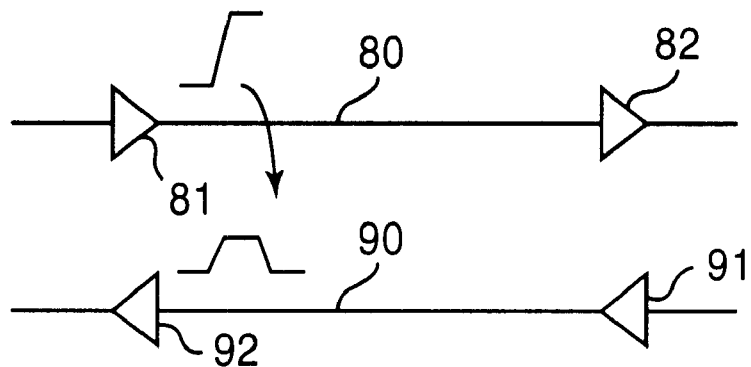
FIGS. 1A and 1B respectively are diagrams for explaining a backward near-end crosstalk for explaining a background of the present invention.
Figure 1B:
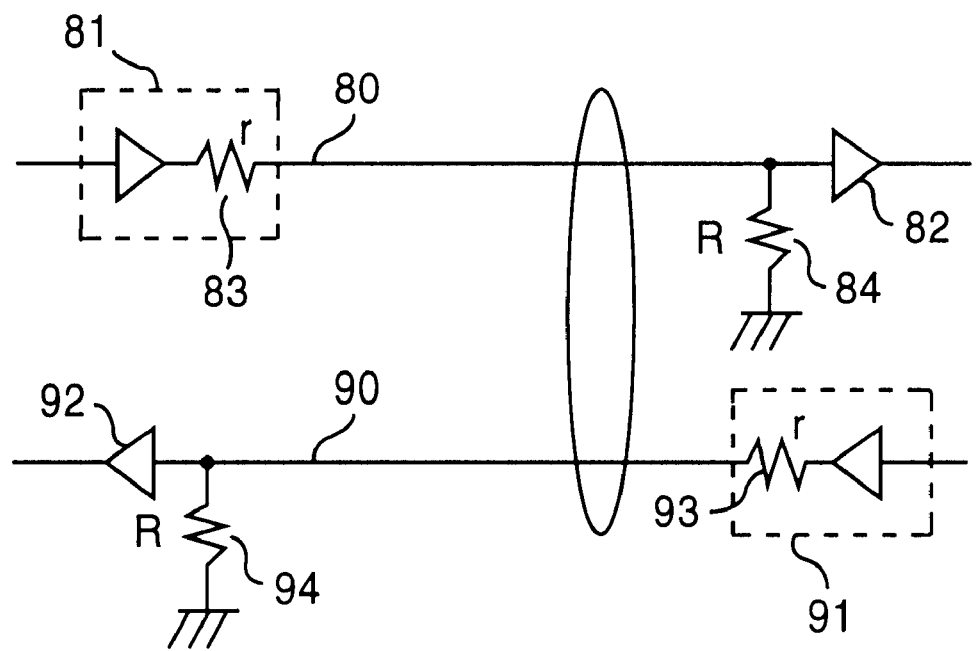
Figure 2:
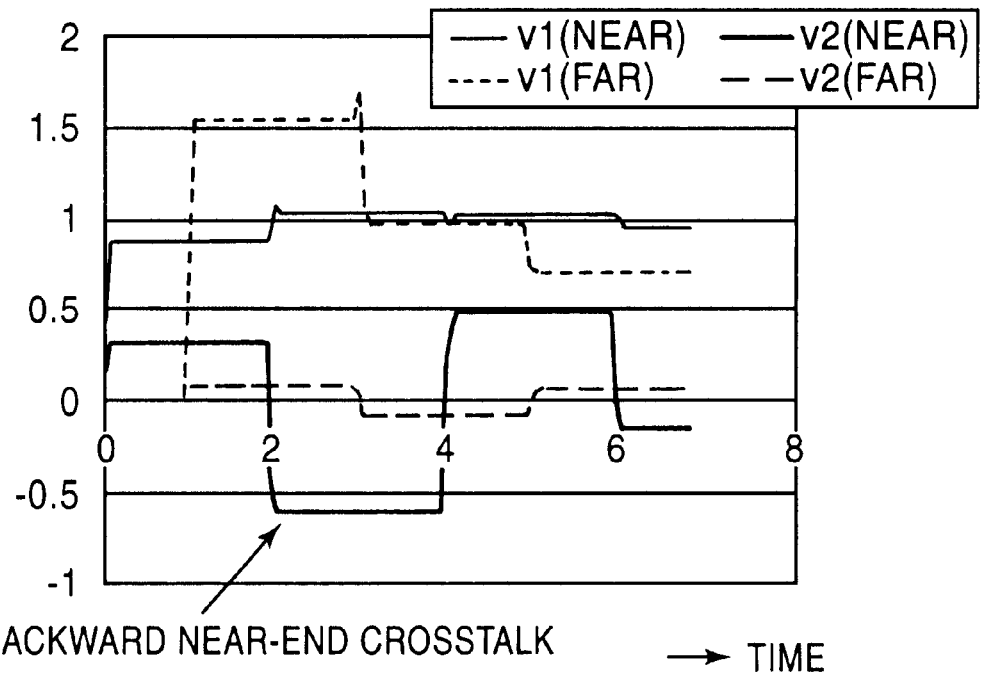
FIG. 2 is a diagram showing the magnitude of a backward near-end crosstalk generated in the transmission circuit shown in FIGS. 1A and 1B.

As may be seen from the analyzed results shown in FIG. 9, the forward far-end crosstalk does clearly appear when the resistance R of the terminating resistor 24 is infinitely large, although the forward far-end crosstalk is not as large as the backward near-end crosstalk described above in conjunction with FIG. 2.

Figure 10:
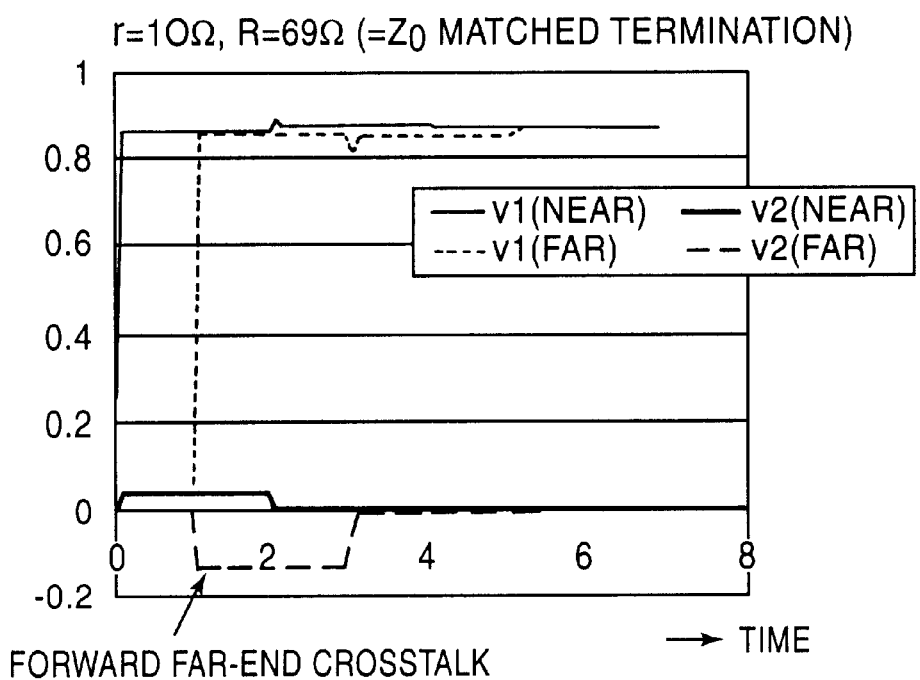
FIG. 10 is a diagram showing an analyzed result of the forward far-end crosstalk.

In a normal transmission circuit, when connecting the terminating resistor, the resistance of the terminating resistor is in general matched to the characteristic impedance $Z_0$ so as to eliminate the signal reflection. Hence, when the resistance R of the terminating resistor 24 shown in FIG. 5B is set to $R=Z_0=69Ω$, and the signal waveforms appearing at the near-end and the far-end of the driving line 10 and the passive line 20 are analyzed, the analyzed results shown in FIG. 10 are obtained. In this case shown in FIG. 10, the forward far-end crosstalk appears at the far-end of the passive line 20, as indicated by the bold dotted line v2(far).

In the present invention, in the transmission circuit having the same construction as that described above, the resistance R of the terminating resistor 24 is selected to R=$Z_0^2$/r. In other words, the resistance R is set as follows.

$$R=Z_0^2/r=69^2/10(\Omega)=475(\Omega)$$

Figure 11:
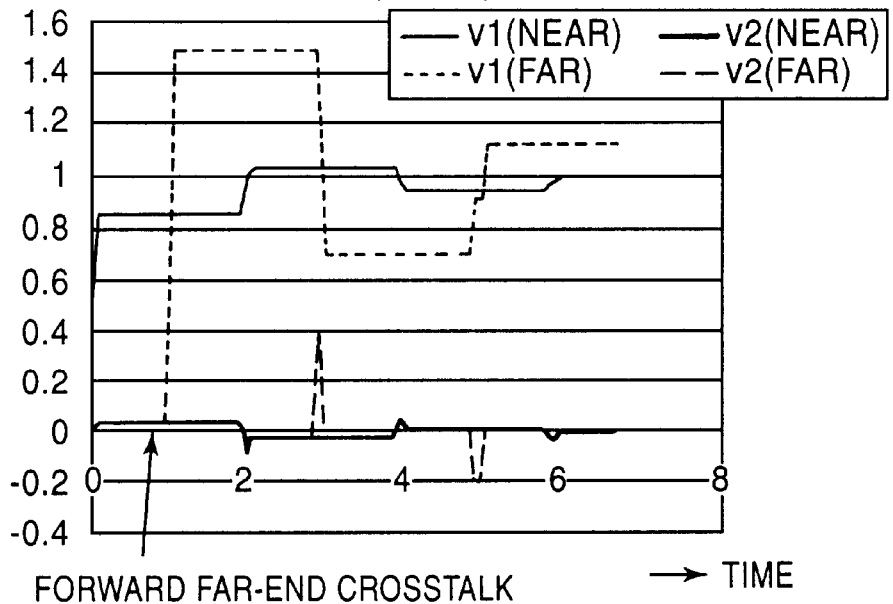
FIG. 11 is a diagram showing an analyzed result of the forward far-end crosstalk.

In this case, the signal waveforms appearing at the near-end and the far-end of the driving line 10 and the passive line 20 become as shown in FIG. 11. As may be seen from FIG. 11, virtually no forward far-end crosstalk is generated at the far-end of the passive line 20. A whisker-like noise is generated theoretically (based on calculations) at the far-end of the passive line 20, but this noise only has a width of approximately 50 ps, and such a noise signal of 100 ps or less can completely be neglected since such a small noise signal will actually disappear due to rounding of the waveform.

Figure 12:
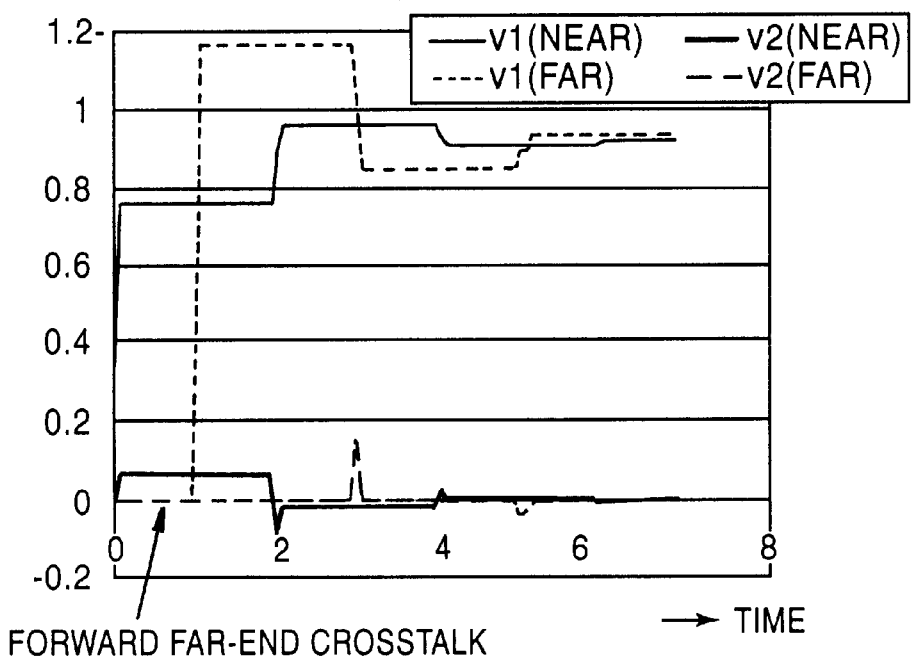
FIG. 12 is a diagram showing an analyzed result of the forward far-end crosstalk.

FIG. 12 shows signal waveforms similar to those shown in FIG. 8, with respect to a case where the value r of the internal resistance 13 of the driver 11 is 20Ω in the transmission circuit shown in FIG. 5B. The resistance R of the terminating resistor 24 is set as follows.

$$R=Z_0^2/r=69^2/20(\Omega)=237(\Omega)$$

In this case, the forward far-end crosstalk also becomes zero.

Figure 13:
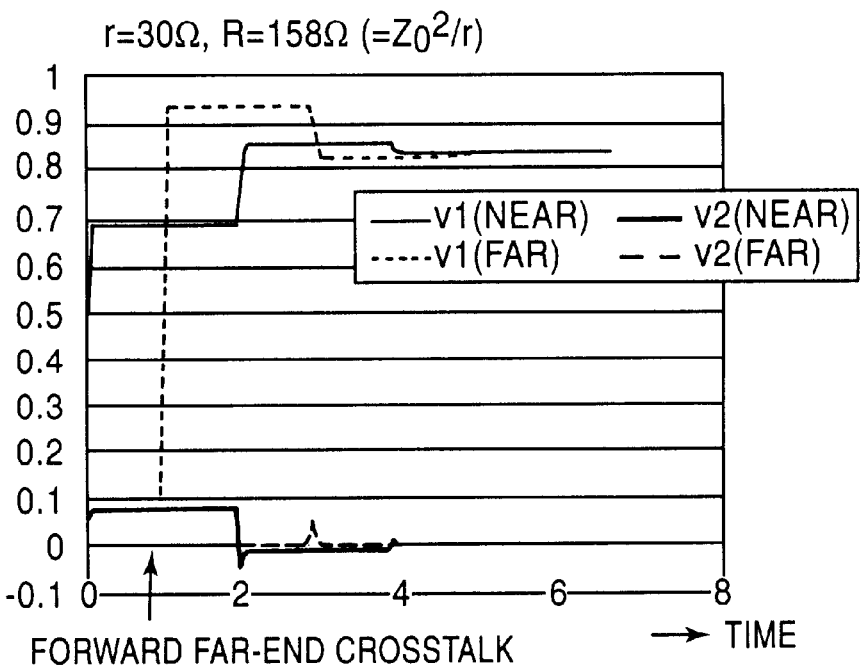
FIG. 13 is a diagram showing an analyzed result of the forward far-end crosstalk.

FIG. 13 shows signal waveforms similar to those shown in FIG. 11, with respect to a case where the value r of the internal resistance 13 of the driver 11 is 30Ω in the transmission circuit shown in FIG. 5B. The resistance R of the terminating resistor 24 is set as follows.

$$R=Z_0^2/r=69^2/30(\Omega)=158(\Omega)$$

In this case, the forward far-end crosstalk also becomes zero.

Next, a description will be given of how the absolute value of the forward far-end crosstalk changes with respect to the drivability of the driver 11, by referring to FIGS. 14 through 17.

Figure 14:
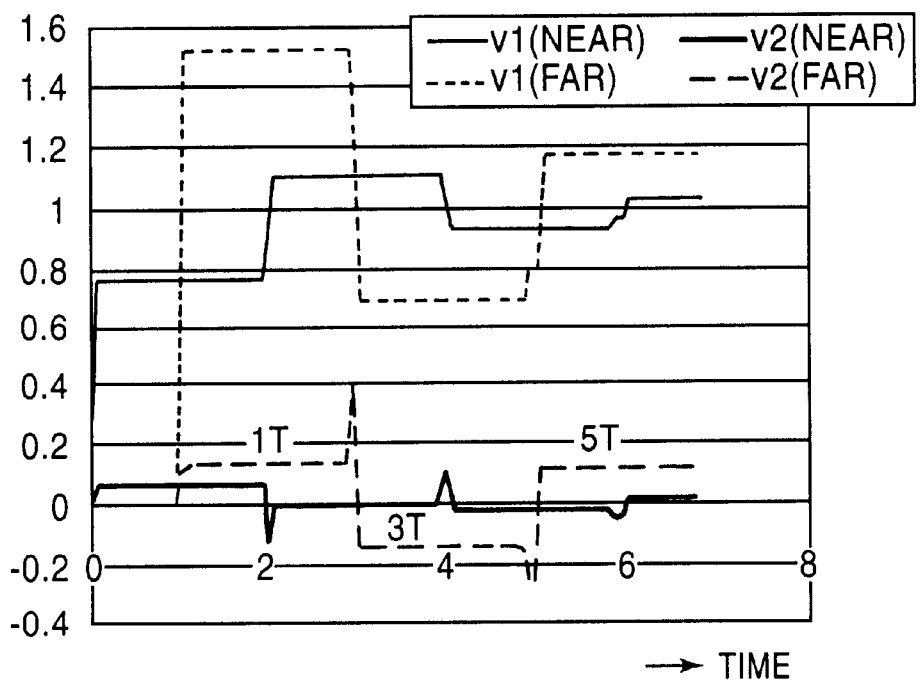
FIG. 14 is a diagram showing timings of the forward far-end crosstalk.

For the sake of convenience, timings of the forward far-end crosstalk are named 1T, 3T and 5T as shown in FIG. 14. 1T indicates a noise value after the time required to travel the line one way, 3T indicates a noise value after the time required to travel the line one way and after the time required to travel the line on both the going and returning ways also elapses, and 5T indicates a noise value after the time required to travel the line on both the going and returning ways elapses after the timing of 3T.

Figure 15:
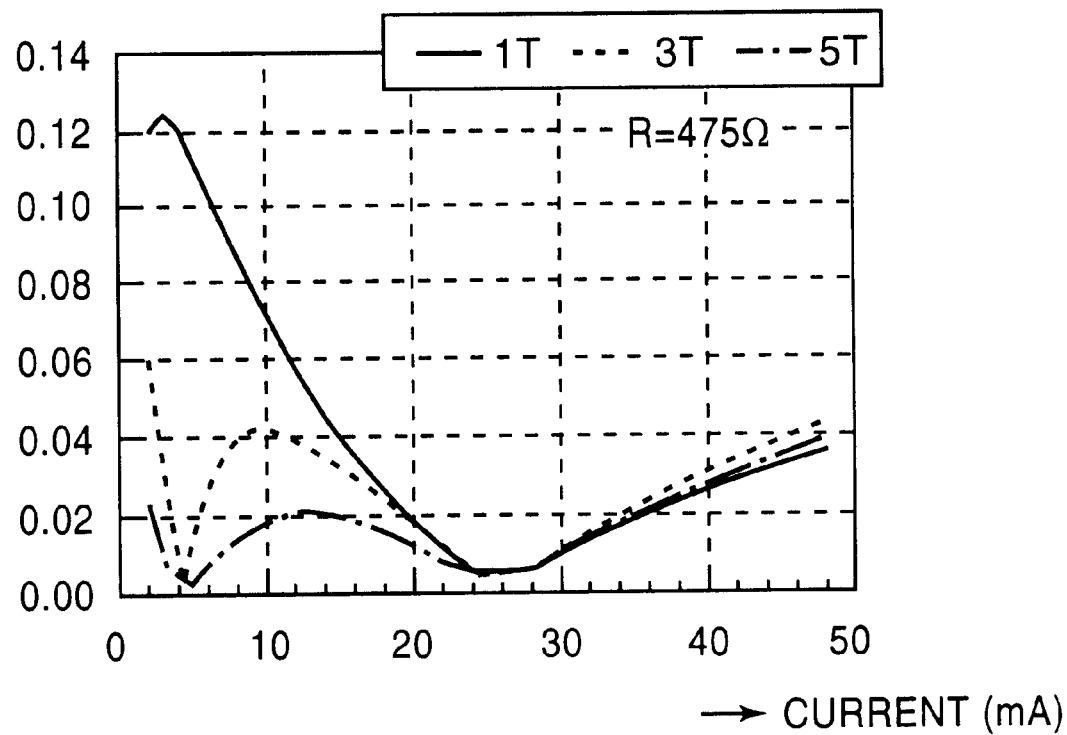
FIG. 15 is a diagram a change in the absolute value of the forward far-end crosstalk with respect to a drivability of a driver.
Figure 16:
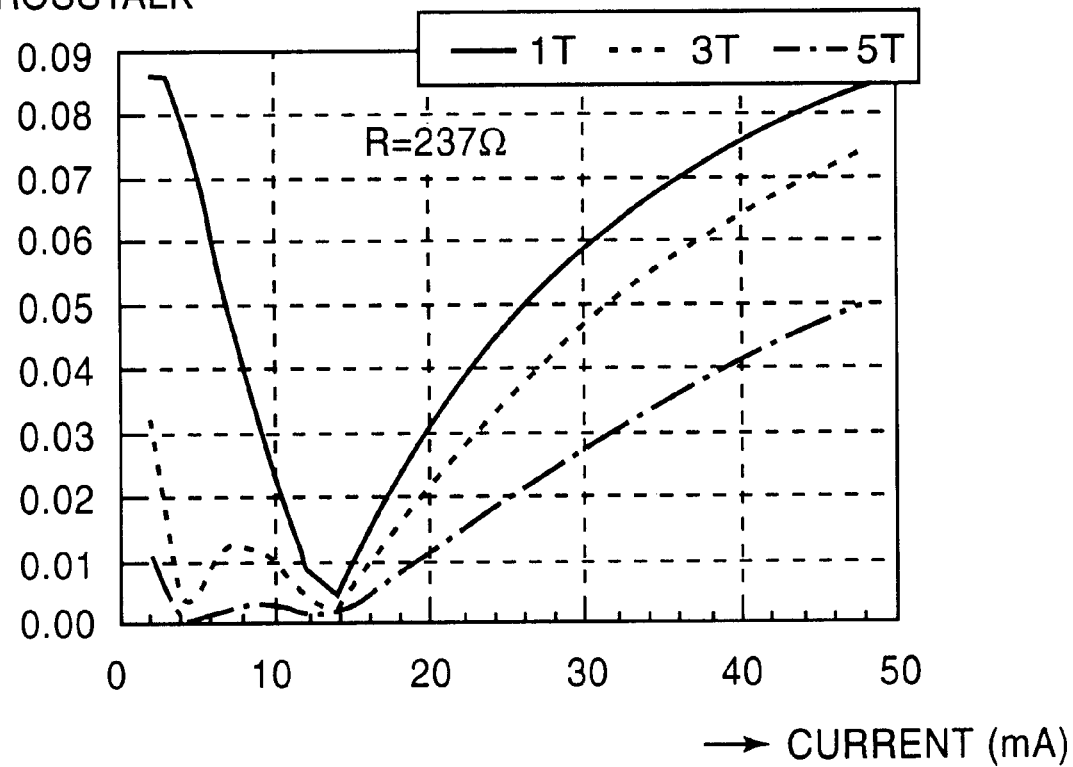
FIG. 16 is a diagram a change in the absolute value of the forward far-end crosstalk with respect to a drivability of a driver.
Figure 17:
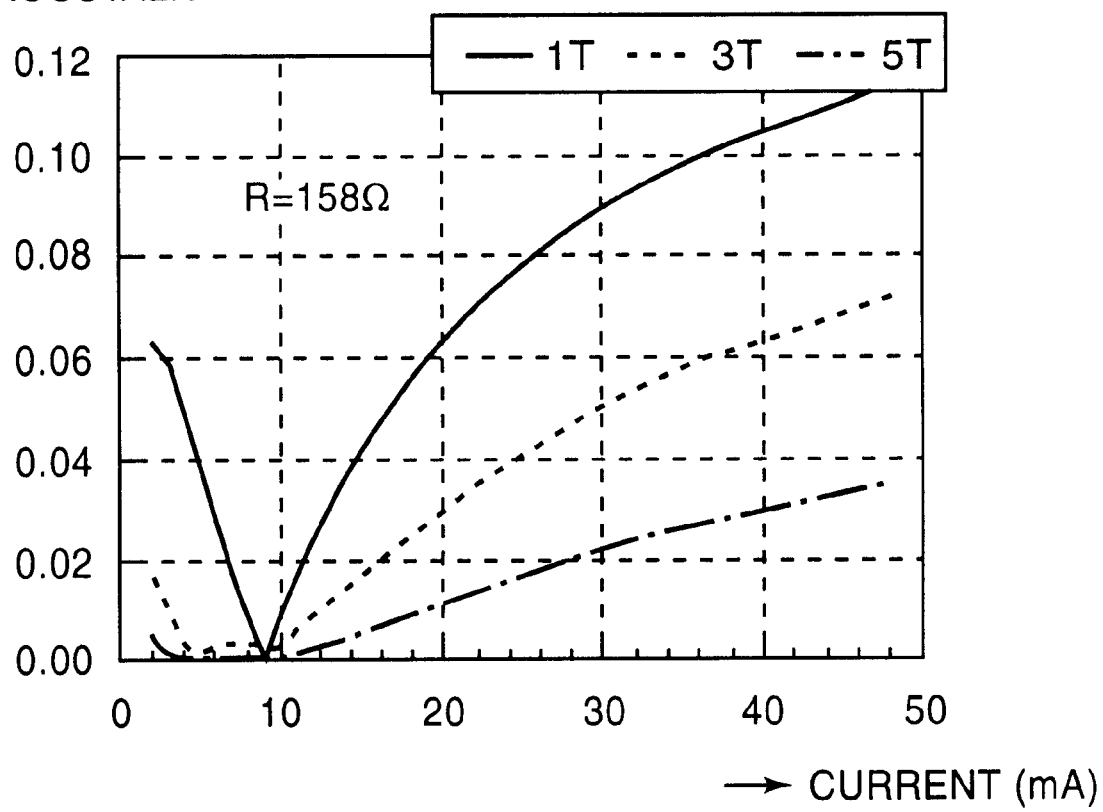
FIG. 17 is a diagram a change in the absolute value of the forward far-end crosstalk with respect to a drivability of a driver.

In FIGS. 15 through 17, the abscissa indicates the drivability of the driver in mA, and the ordinate indicates the magnitude of the crosstalk when the magnitude is normalized by 1. The drivability of the driver can be described by the following.

Drivability (mA)=400(mV)/(1.5×r(Ω))

FIG. 15 shows a case where the resistance R of the terminating resistor is 475Ω and corresponds to the case shown in FIG. 11. FIG. 16 shows a case where the resistance R of the terminating resistor is 237Ω and corresponds to the case shown in FIG. 12. FIG. 17 shows a case where the resistance R of the terminating resistor is 158Ω and corresponds to the case shown in FIG. 13. The crosstalk value at the timings 1T, 3T and 5T changes depending on the drivability of the driver, as shown in FIGS. 15 through 17.

FIGS. 18A and 18B and FIGS. 19A and 19B respectively are diagrams for explaining simulations of the forward far-end crosstalk which is generated, by use of a software circuit simulator. The simulation results shown in FIGS. 18A and 19A respectively correspond to the analyzed result shown in FIG. 12 described above.

Figure 18A:
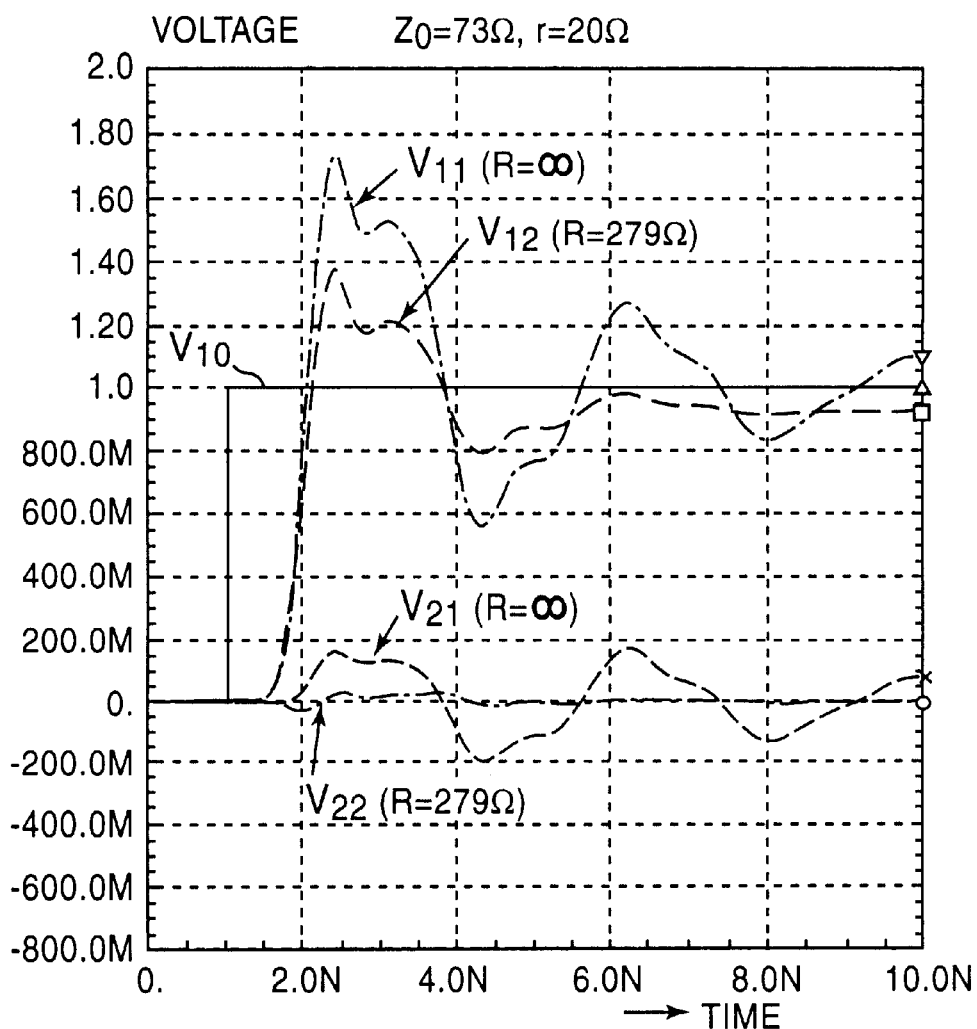
FIGS. 18A and 18B respectively are diagrams for explaining a simulation of the forward far-end crosstalk which is generated.
Figure 18B:
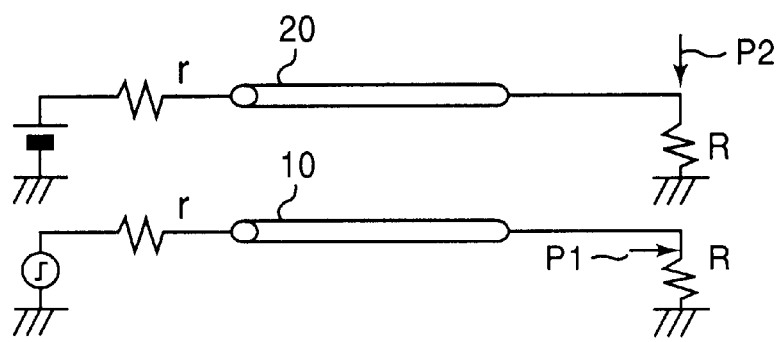

FIG. 18A shows the simulation result which is obtained with respect to two distributed constant lines formed by the driving line 10 and the passive line 20 shown in FIG. 18B. A pattern length of the line was set to 14 cm. The characteristic impedance Z0 of the line was set to 73Ω, and the internal resistance r of the driving source was set to 20Ω.

In FIG. 18A, $v_{10}$ indicates an output signal of the driving source on the driving line 10, $v_{11}$ indicates a signal observed at an observation point P1 on the driving line 10 when the resistance R of the terminating resistor is set infinitely large, and $v_{12}$ indicates a signal change observed at the observation point P1 on the driving line 10 when the resistance R of the terminating resistor is set to 279Ω a value close to ($Z_0^2$/r).

In addition, $v_{21}$ indicates a signal observed at an observation point P2 on the passive line 20 when the resistance R of the terminating resistor is set infinitely large, and $v_{22}$ indicates a signal change obverted at the observation point P2 on the passive line 20 when the resistance R of the terminating resistor is set to 279Ω a value close to ($Z_0^2$/r).

As may be seen from FIG. 18A, virtually no crosstalk noise appears at the far-end of the passive line 20 if the resistance R of the terminating resistor is set to a value close to ($Z_0^2$/r).

Figure 19A:
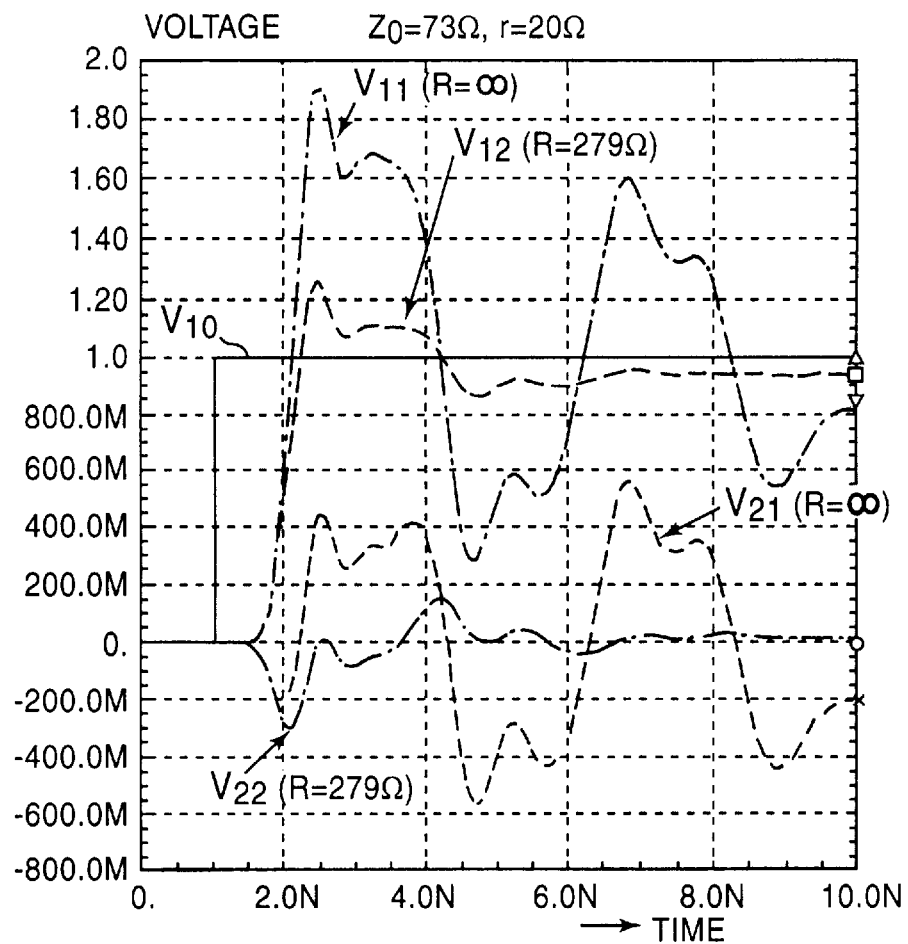
FIGS. 19A and 19B respectively are diagrams for explaining a simulation of the forward far-end crosstalk which is generated.
Figure 19B:
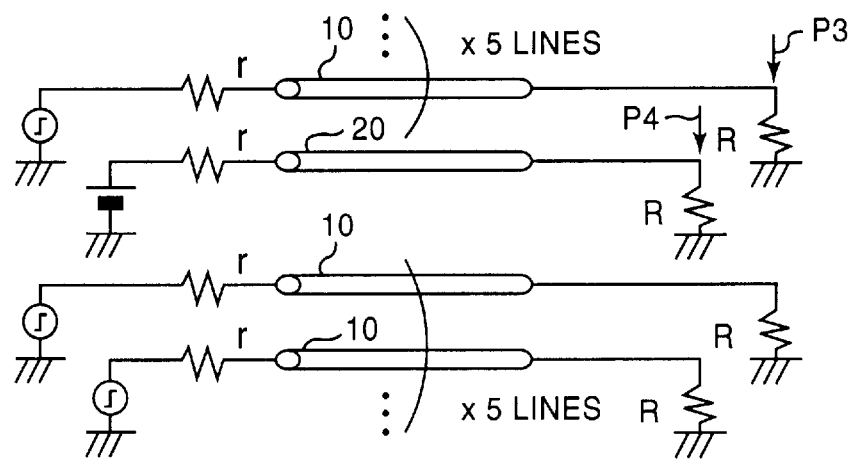

FIG. 19A shows the simulation result which is obtained with respect to the transmission circuit shown in FIG. 19B. In FIG. 19B, 5 driving lines 10 are arranged on both sides of the passive line 20, that is, a total of 10 driving lines 10 are provided. Otherwise, the conditions of this simulation are the same as those used in FIGS. 18A and 18B. Of course, a crosstalk value at an observation point P4 on the passive line 20 shown in FIG. 19B becomes larger than the crosstalk value observed in FIG. 18B. However, when the signal $v_{22}$ which is obtained when the resistance R of the terminating resistor is set to 279Ω is compared with the signal $v_{21}$ which is obtained when the resistance R of the terminating resistor is set infinitely large, that is, R=∞, the crosstalk value is negligibly small. In the signal $v_{22}$, a slight fluctuation in the negative direction appears in correspondence with the rise of the signal $v_{12}$, but this slight fluctuation only occurs for an extremely short time, and no problems are introduced thereby from the practical point of view.

Therefore, by setting the resistance R of the terminating resistor to R=($Z_0^2$/r), it is possible to make the forward far-end crosstalk noise zero. However, when applying the present invention, it is not essential from the practical point of view that the resistance R is set exactly to the above value. For this reason, a description will now be given of the relationship of the error in the terminating resistor and the change in the crosstalk reducing effect.

Figure 21:
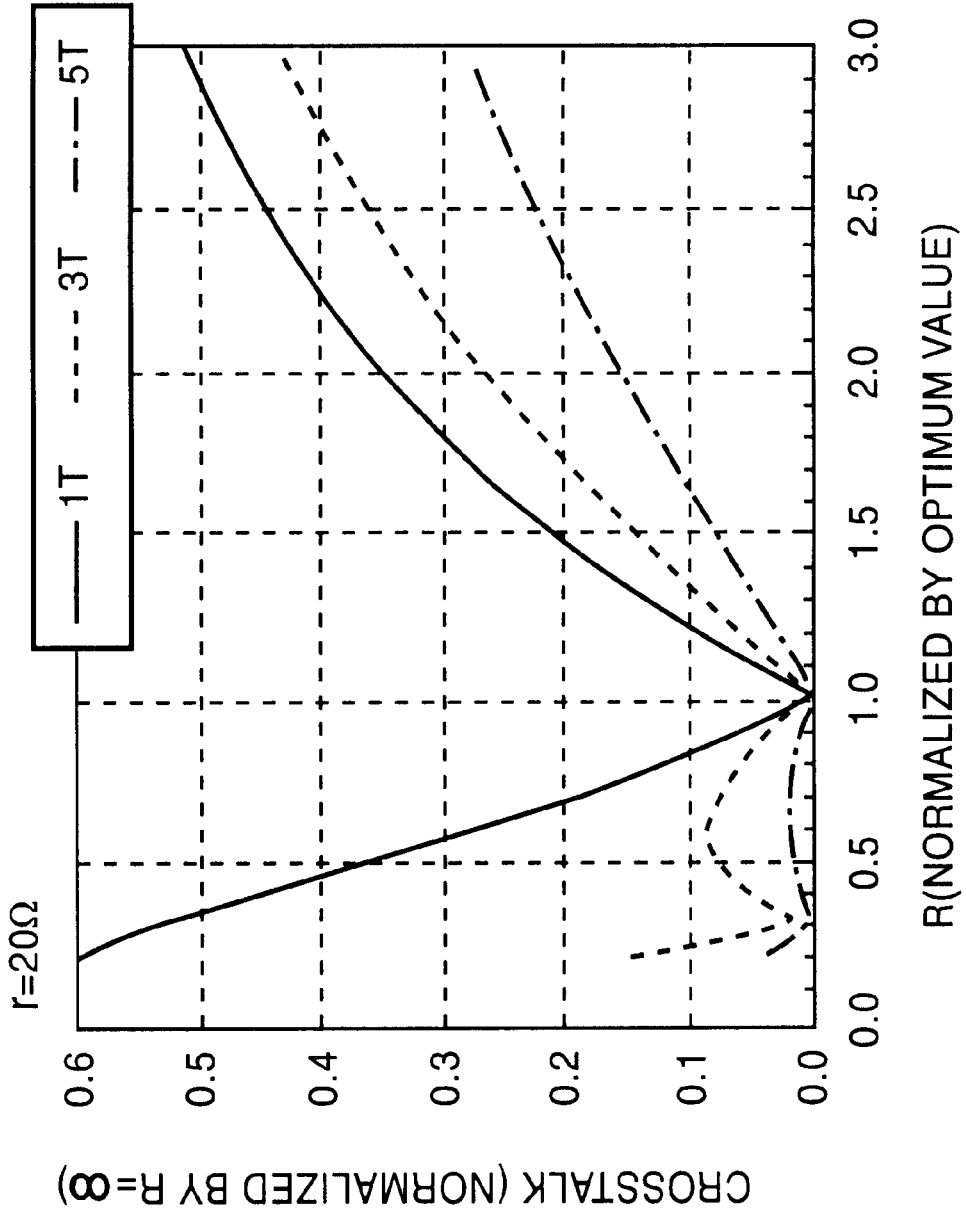
FIG. 21 is a diagram showing the relationship of the magnitude of the resistance R when the terminating resistor is changed with respect to the optimum value and the forward far-end crosstalk reduction.
Figure 22:
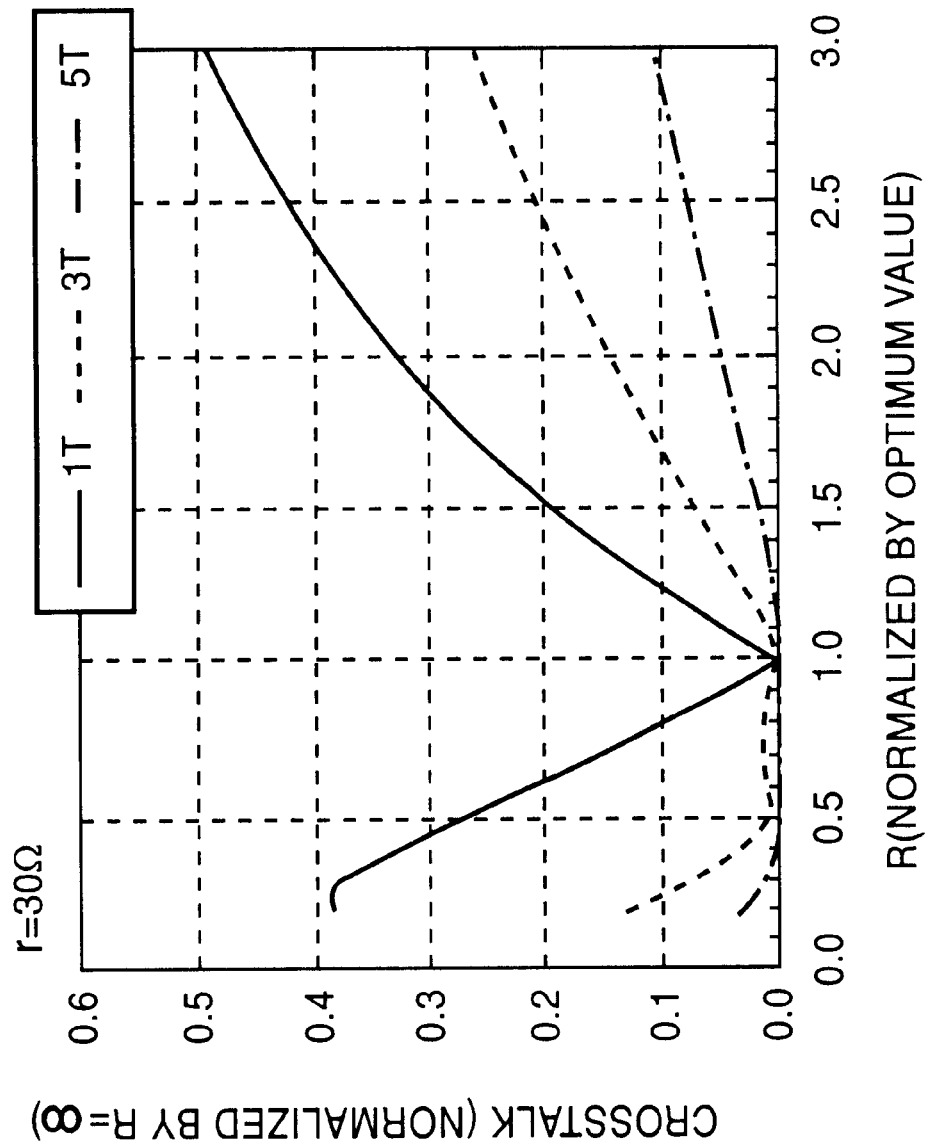
FIG. 22 is a diagram showing the relationship of the magnitude of the resistance R when the terminating resistor is changed with respect to the optimum value and the forward far-end crosstalk reduction.

FIGS. 20 through 22 are diagrams showing the relationship of the resistance R and the forward far-end crosstalk reduction with respect to a case where the terminating resistor is changed from the optimum value R=($Z_0^2$/r). FIG. 20 shows a case where the internal resistance r of the driver is 10Ω, FIG. 21 shows a case where the internal resistance r of the driver is 20Ω, and FIG. 22 shows a case where the internal resistance r of the driver is 30Ω.

In FIGS. 20 through 22, the abscissa indicates the magnitude of the resistance R of the terminating resistor normalized by the optimum value ($Z_0^2$/r), and the ordinate indicates the crosstalk value which is normalized by the crosstalk value which is obtained when the resistance R is infinitely large, that is, R=∞. For example, 0.2 on the scale of the ordinate indicates that the crosstalk noise value can be reduced by up to 20%, that is, reduced to a maximum of ⅕, as compared to the case where no measures are taken to reduce the crosstalk noise. In FIGS. 20 through 22, 1T, 3T and 5T indicate the noise values at the timings described above in conjunction with FIG. 14.

If the crosstalk value can be reduced by up to 20%, this noise elimination measure is sufficient from the practical point of view. Hence, when this is used as a judging value, tolerable values are in the range of 0.7 times to 1.5 times with respect to the maximum value of $R=(Z_0^2/r)$.

Accordingly, it may be regarded that the arrangement falls within the technical range of the present invention if the resistance R of the terminating resistor connected at the far-end of the passive line falls at least within the following range. The resistance R of the terminating resistor which is matched to the characteristic impedance of the line is considerably smaller than a value within this range.

$$(Z_0^2/r) \times 0.7 \leq R \leq (Z_0^2/r) \times 1.5$$

Furthermore, if the resistance R of the terminating resistor connected at the far-end of the passive line falls within the following range, the crosstalk value becomes less than or equal to 10% of the crosstalk value which is obtained when no terminating resistor is connected.

Figure 23:
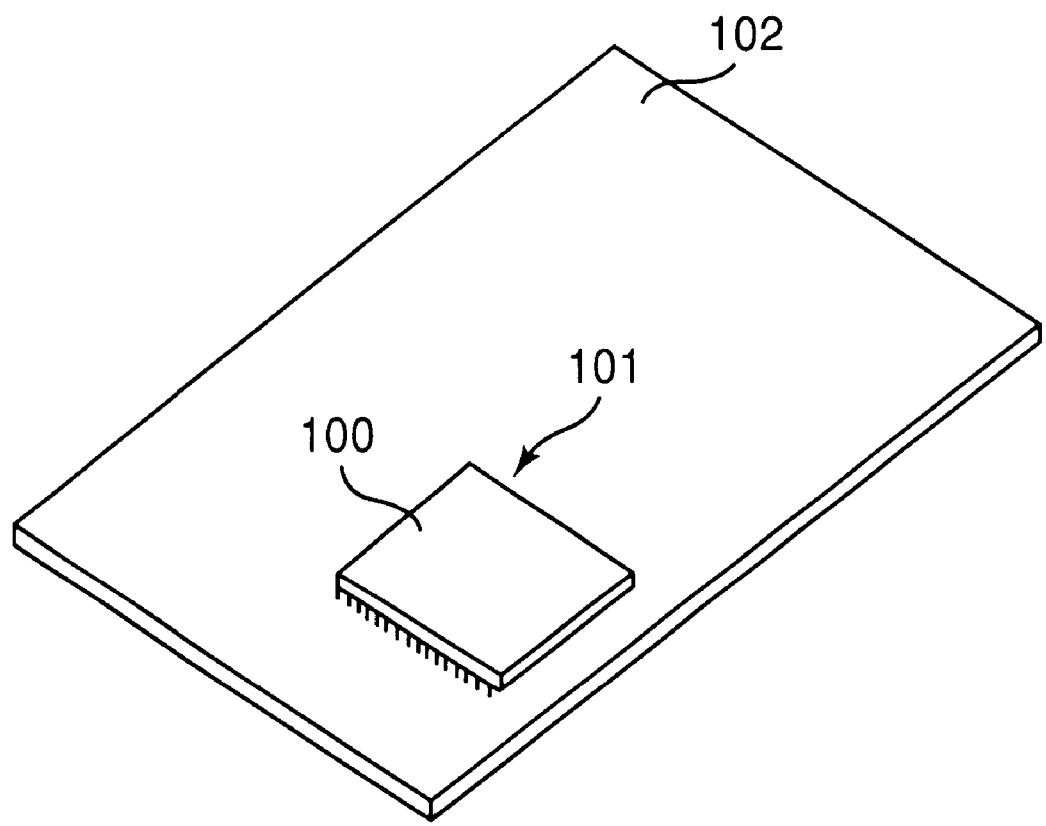
FIG. 23 is a perspective view showing a transmission circuit provided on an IC chip.

FIG. 23 is a perspective view showing a transmission circuit provided in an IC chip. In FIG. 23, a transmission circuit 100 according to the present invention is provided within an IC chip 101. In addition, the IC chip 101 is provided on a board 102, that is, a circuit board provided within a communication unit or an information processing apparatus such as a personal computer. Of course, IC chips and elements other than the IC chip 101 may also be provided on the board 102, but such other IC chips and elements are not directly related to the subject matter of the present invention, and an illustration thereof will be omitted. In addition, the board 102 may of course be constructed to be arranged externally to the apparatus.

Therefore, according to the present invention, it is possible to effectively eliminate the forward far-end crosstalk noise by use of a simple construction. This effect of eliminating the forward far-end crosstalk noise cannot be achieved by other methods such as increasing the pattern gap or reducing the line impedance. According to such other methods, it may be possible to slightly reduce the crosstalk noise, however, it is not only difficult to reduce the crosstalk to a value close to zero, but from the practical point of view, other problems are newly introduced.

Further, the present invention is not limited to these embodiments, but various variations and modifications may be made without departing from the scope of the present invention.

What is claimed is:

1. A noise elimination method wherein:
   when transmitting signals in the same direction on at least two distributed constant lines,
   a resistance of a terminating resistor at a far-end is set so that voltages propagated to the far-end become equal between two kinds of propagation modes on coupled distributed constant lines, said two kinds of propagation modes being a common mode which propagates with respect to a ground plane and a differential mode which propagates between the coupled lines.

2. The noise elimination method as claimed in claim 1, wherein:
   in order to make the voltages propagated to the far-end equal between the two kinds of propagation modes,
   the resistance of the terminating resistor is set so that an approximately reciprocal relationship exists between an internal resistance of a driving source which is normalized by a characteristic impedance of the line, and a terminating resistance of the terminating resistor at the far-end normalized by the characteristic impedance of the line.

3. A noise elimination method wherein:
   when first and second driving sources are coupled to respective ends of at least two distributed constant lines on which signals can be transmitted two ways, and a signal is to be transmitted from the first driving source to the other end or from the second driving source to the other end,
   a resistance of a terminating resistor is set so that an approximately reciprocal relationship exists between an internal resistance of the first or second driving source normalized by a characteristic impedance of the line, and a terminating resistance at a far-end with respect to the first or second driving source normalized by the characteristic impedance of the line.

4. A transmission circuit having at least two distributed constant lines for transmitting signals in the same direction, comprising:
   a terminating resistor is coupled at a far-end of the distributed constant lines, and the terminating resistor has a terminating resistance which is set so that an approximately reciprocal relationship exists between the terminating resistance which is normalized by a characteristic impedance of the line and an internal resistance of a driving source which is normalized by the characteristic impedance of the line.

5. The transmission circuit as claimed in claim 4, wherein a terminating voltage of the terminating resistor is set to a logic amplitude "0", a logic amplitude "1" or an intermediate value between the logic amplitudes "0" and "1".

6. The transmission circuit as claimed in claim 4, wherein the terminating resistor includes two resistors coupled in series between a voltage corresponding to a logic amplitude "1" and a voltage corresponding to a logic amplitude "0", and a node connecting the two resistors is coupled to the far-end of the line.

7. The transmission circuit as claimed in claim 4, wherein the terminating resistor includes a non-inverting gate circuit having an input and an output which are directly coupled or indirectly coupled via a resistor.

8. The transmission circuit as claimed in claim 7, which further comprises a resistor coupled between the input of said non-inverting gate circuit and the far-end of the line.

9. The transmission circuit as claimed in claim 8, wherein a sum of an output resistance of the non-inverting gate circuit, a resistance of the resistor coupling the input and the output of the non-inverting gate circuit, and a resistance of the resistor coupled between the input of the non-inverting gate circuit and the far-end of the line is equal to the terminating resistance of the terminating resistor.

10. The transmission circuit as claimed in claim 4, wherein the terminating resistor includes a non-inverting gate circuit having an input and an output which are coupled, and a sum of an output resistance of the non-inverting gate circuit normalized by the characteristic impedance of the line and a resistance between the input and the output of the non-inverting gate circuit is equal to the terminating resistance of the terminating resistor.

11. The transmission circuit as claimed in claim 4, wherein the terminating resistor includes a circuit having a resistance selected in response to an external control input.

12. A transmission circuit having at least two distributed constant lines for transmitting signals two ways, and driving sources of the signals on both end of the lines, comprising:

a terminating resistor is coupled to a far-end of the distributed constant lines with respect to each driving source, and the terminating resistor has a terminating resistance which is set so that an approximately reciprocal relationship exists between the terminating resistance which is normalized by a characteristic impedance of the line and an internal resistance of the driving source which is normalized by the characteristic impedance of the line.

13. The transmission circuit as claimed in claim 12, wherein a terminating voltage of the terminating resistor is set to a logic amplitude "0", a logic amplitude "1" or an intermediate value between the logic amplitudes "0" and "1".

14. The transmission circuit as claimed in claim 12, wherein the terminating resistor includes two resistors coupled in series between a voltage corresponding to a logic amplitude "1" and a voltage corresponding to a logic amplitude "0", and a node connecting the two resistors is coupled to the far-end of the line.

15. The transmission circuit as claimed in claim 12, wherein the terminating resistor includes a non-inverting gate circuit having an input and an output which are directly coupled or indirectly coupled via a resistor.

16. The transmission circuit as claimed in claim 15, which further comprises a resistor coupled between the input of said non-inverting gate circuit and the far-end of the line.

17. The transmission circuit as claimed in claim 16, wherein a sum of an output resistance of the non-inverting gate circuit, a resistance of the resistor coupling the input and the output of the non-inverting gate circuit, and a resistance of the resistor coupled between the input of the non-inverting gate circuit and the far-end of the line is equal to the terminating resistance of the terminating resistor.

18. The transmission circuit as claimed in claim 12, wherein the terminating resistor includes a non-inverting gate circuit having an input and an output which are coupled, and a sum of an output resistance of the non-inverting gate circuit normalized by the characteristic impedance of the line and a resistance between the input and the output of the non-inverting gate circuit is equal to the terminating resistance of the terminating resistor.

19. The transmission circuit as claimed in claim 12, wherein the terminating resistor includes a circuit having a resistance selected in response to an external control input.

20. In a transmission circuit coupled to at least two distributed constant lines for transmitting signals in the same direction from a signal driver at a respective near-end of each one of the distributed constant lines to a signal receiver at a respective far-end of the one of the distributed constant lines, wherein the signal receiver comprises a terminating resistor coupled to the respective far-end of the one of the distributed constant lines;

the improvement wherein:

the terminating resistor has a resistance value, other than a value to reduce signal reflection, chosen to reduce a far-end crosstalk noise generated at the far end.

21. A transmission circuit coupled to at least two distributed constant lines for transmitting signals in the same direction, characterized by:

a terminating resistor having a resistance which makes voltages propagated on the distributed constant lines equal between a common mode and a differential mode.

22. An IC chip characterized by a transmission circuit according to claim 4 or 12.

23. A board characterized by an IC chip according to claim 21.

24. A noise elimination method wherein:

when transmitting signals in the same direction on at least two distributed constant lines, a resistance R of a terminating resistor at a far-end is set to approximately $R=Z_0^2/r,$ where $Z_0$ is a characteristic impedance of the lines and r is a resistance at a near-end.

* * * * *